(12) United States Patent
Yoshida et al.

(10) Patent No.: US 7,864,637 B2
(45) Date of Patent: Jan. 4, 2011

(54) OPTICAL DISC RECORDING AND REPRODUCING APPARATUS AND DISC AUTOCHANGER

(75) Inventors: Takashi Yoshida, Hitachinaka (JP); Toshihiko Shimizu, Hitachinaka (JP); Yukinobu Abe, Hitachinaka (JP); Hiroyuki Awano, Ibaraki (JP); Yutaka Watanabe, Ibaraki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 888 days.

(21) Appl. No.: 11/785,378

(22) Filed: Apr. 17, 2007

(65) Prior Publication Data

US 2008/0117726 A1 May 22, 2008

(30) Foreign Application Priority Data

| Apr. 18, 2006 | (JP) | 2006-113951 |
| Apr. 18, 2006 | (JP) | 2006-113952 |
| Apr. 18, 2006 | (JP) | 2006-113953 |
| Apr. 24, 2006 | (JP) | 2006-118795 |

(51) Int. Cl.
 *G11B 17/22* (2006.01)
(52) U.S. Cl. .................................. 369/30.85; 720/615
(58) Field of Classification Search .............. 369/30.85, 369/30.28, 30.76, 30.77, 30.78, 30.92; 720/615, 720/706
See application file for complete search history.

(56) References Cited

U.S. PATENT DOCUMENTS

| 5,872,748 | A | * | 2/1999 | Shindo et al. | ............ 369/30.85 |
| 5,903,538 | A | * | 5/1999 | Fujita et al. | ............... 369/30.76 |
| 6,058,096 | A | * | 5/2000 | Fujita et al. | ............... 369/30.85 |
| 6,167,020 | A | * | 12/2000 | Hisamatsu et al. | ........ 369/30.85 |
| 6,310,853 | B1 | * | 10/2001 | Ito | .............................. 720/607 |

(Continued)

FOREIGN PATENT DOCUMENTS

JP 2000-207862 A 7/2000

(Continued)

*Primary Examiner*—Angel A. Castro
(74) *Attorney, Agent, or Firm*—Birch, Stewart, Kolasch & Birch, LLP

(57) ABSTRACT

An object of the invention is to provide a disc autochanger without any disc reversing mechanism by using on A-side recording and reproducing apparatus and a B-side recording and reproducing apparatus while using a sheet-like optical disc in which both surfaces can be recorded and reproduced. The disc autochanger is constituted by a cartridge storing a plurality of sheet-like optical discs in which both surfaces are recorded and reproduced in a state of putting in a tray, the A-side recording and reproducing apparatus in which a moving table of an A-side recording and reproducing portion is arranged in an upper side of a tray take-out mechanism and a moving table of a cap is provided in a lower side thereof, and the B-side recording and reproducing apparatus in which a moving table of a B-side recording and reproducing portion is arranged in a lower side of the tray take-out mechanism and a moving table of a cap is provided in an upper side thereof. Accordingly, since it is possible to alternately supply the sheet-like optical discs in which both surfaces are recorded and reproduced to the A-side and B-side recording and reproducing apparatuses from the cartridge, it is possible to record and reproduce continuously and in parallel.

26 Claims, 13 Drawing Sheets

U.S. PATENT DOCUMENTS

| | | | |
|---|---|---|---|
| 6,359,843 B1 * | 3/2002 | Motoki | 369/30.92 |
| 6,584,063 B1 * | 6/2003 | Nagasaka et al. | 720/607 |
| 2002/0021653 A1 * | 2/2002 | Takeshima et al. | 369/191 |
| 2002/0191528 A1 * | 12/2002 | Sugaya | 369/197 |

FOREIGN PATENT DOCUMENTS

| | | |
|---|---|---|
| JP | 2004-134019 A | 4/2004 |
| JP | 2005-31930 A | 2/2005 |
| JP | 2005-108432 A | 4/2005 |

* cited by examiner

OPTICAL DISC RECORDING AND REPRODUCING APPARATUS AND DISC AUTOCHANGER

BACKGROUND OF THE INVENTION

1. Field of the Invention

The present intention relates to an optical disc recording and reproducing apparatus for taking out an optical disc from a cartridge storing a lot of sheet-like optical discs so as to record and reproduce data, and a disc autochanger structured such as to carry the cartridge to a plurality of optical disc recording and reproducing apparatuses and take out the optical disc so as to record and reproduce.

2. Description of Related art

Patent document 4 and the like have been conventionally known as a clamper for fixing an optical disc to a disc rotating portion at a time of recording and reproducing the optical disc, in an apparatus for recording and reproducing the optical disc such as CD, DVD or the like.

Further, patent document 1 and the like have been provided as a cartridge storing sheet-like optical discs having a flexibility and a recording and reproducing apparatus of the same. Further, patent document 2, patent document 3 and the like have been known as a disc autochanger of CD, DVD or the like which is made high capacity by storing a lot of optical discs.

The clamper described in the patent document 4 is structured such that a disc rotating portion fixing the optical disc is formed in a convex shape, and a taper is provided in a leading end. A center hole of the optical disc is inserted to the convex shape and is fixed by a concave clamper. In this case, there is disclosed a structure in which a magnet is embedded in the convex shape of the rotating portion, and the clamper embedding iron pieces therein is sucked by a magnetic suction force so as to fix the optical disc and the clamper to the rotating portion.

In the cartridge described in the patent document 1, there is disclosed a structure in which the optical disc is laminated in the cartridge, a sheet is pinched and laminated between the optical discs and the optical discs are put in a small cartridge so as to be laminated. Further, there is disclosed the recording and reproducing apparatus which takes out all the laminated optical discs from the cartridge, thereafter separates the optical discs in sequence from an outer side by a roller, carries the optical discs by the roller and chucks to a rotating shaft so as to record and reproduce.

Further, in the disc autochanger described in the patent document 2 and the patent document 3, there is disclosed a disc autochanger which can record and reproduce both surfaces by setting a disc reversing apparatus for reversing the both surface recording and reproducing optical disc.

Patent Document 1: JP-A-2004-134019
Patent Document 2: JP-A-2005-31930
Patent Document 3: JP-A-2005-108432
Patent Document 4: JP-A-2000-207862

First, in the clamper described in the patent document 4, in the case of being applied to an A-side recording and reproducing apparatus in which a disc rotating portion is provided in an upper side of the optical disc mounted on a tray and the clamper is arranged in a lower side, the optical disc is mounted on the clamper so as to be moved to the disc rotating portion and be thereafter fixed. Accordingly, the optical disc mounted on the clamper for is displaced and it is hard to accurately fix the optical disc. Further, in the case of returning the optical disc to the tray from the disc rotating portion, it is hard to return the optical disc to a predetermined position for making the optical disc come down from the disc rotating portion.

Further, since the recording and reproducing apparatus employs a roller carrier accompanying a friction and a slip, the recording and reproducing apparatus has problems in a damage of the optical disc, a positioning precision at a time of carrying, and a downsizing.

In order to stably record and reproduce the sheet-like optical disc, it is necessary to stably rotate the optical disc without vibrating the recording and reproducing surface of the optical disc. In the prior art, there has been used a method of reducing the vibration on the basis of a balance of a fluid force by arranging a stabilizing plate in an upper side of the optical disc independently, in a lower side independently or in the upper and lower sides, however, there is a problem that it the rotating speed is high, the stabilizing plate becomes unstable and it is impossible to reduce the vibration.

Further, there is a problem that the conventional sheet-like optical disc recording and reproducing apparatus is not compatible with the optical disc having a thickness of 1.2 mm such as a Blu-Ray, a DVD, a DC and the like.

Further, in the cartridge described in the patent document 1, it is hard to take out the optical discs one by one from the cartridge. Further, it is hard to accurately return the optical disc to the cartridge. Accordingly, there is a problem that it is impossible to access in a random order.

Further, since the disc autochangers described in the patent document 2 and the patent document 3 execute the both-surface recording and reproducing by using the disc reversing apparatus, there is a problem that a replacing time of the disc is long and the apparatus is enlarged in size.

BRIEF SUMMARY OF THE INVENTION

The present invention aims to solve the problems mentioned above, and an object of the present invention is to provide an A-side and B-side recording and reproducing apparatus having a high reliability, a small size and a high capacity, which can take out sheet-like optical discs one by one and can access in a random order, and a high-speed, small-sized and high-capacity disc autochanger using a sheet-lire optical disc in which both surfaces are recorded and reproduced, without any disc reversing mechanism.

In order to achieve the object mentioned above, in accordance with a first aspect of the present invention, there is provided an optical disc recording and reproducing apparatus comprising:

a tray mounting an optical disc thereon;
a cartridge storing a plurality of said trays;
a moving table moving said cartridge up and down; and
a tray take-cot mechanism taking out said tray and carrying said optical disc to a recording and reproducing portion, wherein the recording and reproducing portion recording and reproducing an A-side of said optical disc, and a moving table moving said recording and reproducing portion up and down are arranged in an upper side of said tray take-out mechanism, wherein a lower side of said tray take-out mechanism is provided with a cap fixing said optical disc to a rotating portion of said recording and reproducing portion, a connecting and disconnecting means capable of connecting and disconnecting said cap, and a moving table moving said cap and said connecting and disconnecting means up and down, wherein said tray is taken out from said cartridge, said optical disc is fixed to the rotating portion of said recording and reproducing portion by said cap by moving said recording and reproducing portion and the cap close to said optical disc on said tray, said cap is disconnected from said connecting and disconnecting means, said recording and reproducing portion and said connecting and disconnecting means are moved out of a moving passage of said tray take-out mechanism, and the A side of said optical disc is recorded and reproduced after returning said tray to said cartridge by said tray take-out mechanism. Accordingly, there is obtained an effect that it is possible so obtain the A-side recording and reproducing apparatus having the high reliability, the small size and the high capacity.

Next, there is provided an optical disc recording and reproducing apparatus comprising:

a tray mounting an optical disc thereon;
a cartridge storing a plurality of said trays;
a moving table moving said cartridge up and down; and
a tray take-out mechanism taking out said tray and carrying said optical disc to a recording and reproducing portion, wherein the recording and reproducing portion recording and reproducing a B side of the optical disc, and a moving table moving the recording and reproducing portion up and down are arranged in a lower side of the tray take-out mechanism, wherein an upper side of the tray take-out mechanism is provided with a cap fixing the optical disc to a rotating portion of the recording and reproducing portion, a disc holding means adsorbing the optical disc, and a moving table moving the cap and the disc holding means up and down, wherein the tray is taken out from the cartridge, the optical disc is adsorbed to the disc holding means by moving the recording and reproducing portion and the disc holding means close to the optical disc on the tray, the recording and reproducing portion and the disc holding means are moved out of a moving passage of the tray take-out mechanism, the tray is returned to the cartridge by the tray take-out mechanism, and the B side of the optical disc is recorded and reproduced after fixing the disc to the rotating portion of the recording and reproducing portion by the cap by moving the recording and reproducing portion, the cap and the disc holding means close to each other. Accordingly, there is obtained an effect that it is possible to obtain the B-side recording and reproducing apparatus having the high reliability, the small size and the high capacity.

Next, there is obtained a disc autochanger, wherein the optical disc recording and reproducing apparatus recording and reproducing the A side of the optical disc, and the optical disc recording and reproducing apparatus recording and reproducing the B side of the optical disc are arranged in a vertical direction, the disc autochanger is provided with a moving table moving the cartridge moving between the two optical disc recording and reproducing apparatuses, and the cartridge is supplied to the two optical disc recording and reproducing apparatuses so as to record and reproduce. Accordingly, there is obtained an effect that it is possible to obtain a high-speed, small-sized and high-capacity disc autochanger using the optical disc in which both surfaces are recorded and reproduced, without any disc reversing mechanism.

Next, there is provided a disc autochanger, wherein the optical disc recording and reproducing apparatuses recording and reproducing the A side of the optical disc are arranged in a vertical direction, the disc autochanger is provided with a moving table moving the cartridge moving between the two optical disc recording and reproducing apparatuses, and the optical disc is supplied to the two optical disc recording and reproducing apparatuses from the cartridge so as to record and reproduce. Accordingly, there is obtained an effect that it is possible to obtain a high-speed, small-sized and high-capacity disc autochanger by using the optical disc in which one surface is recorded and reproduced.

Next, there is provided a disc autochanger, wherein the optical disc recording and reproducing apparatuses recording and reproducing the B side of the optical disc are arranged in a vertical direction, the disc autochanger is provided with a moving table moving the cartridge moving between the two optical disc recording and reproducing apparatuses, and the optical disc is supplied to the two optical disc recording and reproducing apparatuses from the cartridge so as to record and reproduce. Accordingly, there is obtained an effect that it is possible to obtain a high-speed, small-sized and high-capacity disc autochanger by using the optical disc in which one surface is recorded and reproduced.

Next, an electromagnet is used as the connecting and disconnecting means connecting and disconnecting the cap. Accordingly, it is possible to store the tray in the cartridge, and there is obtained a downsizing effect.

Next, an electromagnet is used as the disc holding means adsorbing the optical disc, sucks a ring fitted to a lower side of the disc in the rotating portion of the recording and reproducing portion, and sandwiches the disc between the ring and the electromagnet so as to hold in the disc holding means. Accordingly, it is possible to store the tray in the cartridge and there is obtained an effect of downsizing the recording and reproducing apparatus and the disc autochanger.

Next, a glass disc having a hole sucking an air in an inner peripheral side is provided in the rotating portion of the recording and reproducing portion, a ring is provided on the glass disc for spacing between the glass disc and the optical disc, and the optical disc is installed on the ring. Accordingly, since the air flows to an outer periphery from an inner peripheral side of the glass disc between the optical disc and the glass disc, there is obtained an effect that a negative pressure is generated between the optical disc and the glass disc, and the optical disc is sucked close to the glass disc side, whereby a stable rotation with no side runout can be obtained.

Next, the ring is structured such that a ring of a ferromagnetic material is attached to an outer periphery of a ring of a non-magnetic material. Accordingly, since the magnet sucking the cap embedded in the rotating portion and the ring of the ferromagnetic material are away from each other, there is obtained an effect that they are not sucked.

Next, the structure is made such that the magnet is embedded in an inner peripheral side of the glass disc. Accordingly, there is obtained an effect that it is possible to adsorb or separate the ring placed on the glass disc.

Accordingly, next, there is provided an optical disc recording and reproducing apparatus comprising:

a tray mounting an optical disc thereon;
a cartridge storing a plurality of the trays;
a moving table moving the cartridge up and down; and
a tray take-out mechanism taking out the tray and carrying the optical disc to a recording and reproducing portion, wherein the recording and reproducing portion recording and reproducing an upper surface of the optical disc, and a moving table moving the recording and reproducing portion up and down are arranged in an upper side of the tray take-out mechanism, wherein a lower side of the tray take-out mechanism is provided with a cap fixing the optical disc to a rotating portion of the recording and reproducing portion, a floating stabilizing disc stably floating the optical disc provided in the cap, and a moving table moving the cap up and down, wherein the tray is taken out from the cartridge, the optical disc is fixed to the rotating portion of the recording and reproducing portion by the cap by moving the recording and reproducing portion and the cap to the optical disc on the tray, and the upper surface of the optical disc is recorded and reproduced. Accordingly, there is obtained an effect that it is possible to obtain the A-side recording and reproducing apparatus having the high reliability, the small size and the high capacity.

Next, there is provided an optical disc recording and reproducing apparatus comprising:

a tray mounting an optical disc thereon;
a cartridge storing a plurality of the trays;
a moving table moving the cartridge up and down; and
a tray take-out mechanism taking out the tray and carrying the optical disc to a recording and reproducing portion, wherein the recording and reproducing portion recording and reproducing an upper surface of the optical disc, a disc holding means lifting up the optical disc, and a moving table moving the recording and reproducing portion and the disc holding means up and down are arranged in an upper side of the tray take-out mechanism, wherein a lower side of the tray take-out mechanism is provided with a cap fixing the optical disc to a rotating portion of the recording and reproducing portion, a floating stabilizing disc stably floating the optical disc provided in the cap, and a moving table moving the cap up and down, wherein the tray is taken out from the cartridge, the optical disc is held by the disc holding means by moving the disc holding means and the cap close to the optical disc on the tray, the disc holding means holding the optical disc and the cap are moved out of a moving passage of the tray take-out mechanism, the tray is returned to the cartridge by the tray take-out mechanism, and the upper surface of the optical disc is recorded and reproduced after fixing the optical disc of the disc holding means to the rotating portion of the recording and reproducing portion by the cap. Accordingly, there is obtained an effect that it is possible to obtain the A-side recording and reproducing apparatus having the high reliability, the small size and the high capacity.

Next, there is provided an optical disc recording and reproducing apparatus comprising:

a tray mounting an optical disc thereon;
a cartridge storing a plurality of the trays;
a moving sable moving the cartridge up and down; and
a tray take-out mechanism taking out the tray and carrying the optical disc to a recording and reproducing portion, wherein the recording and reproducing portion recording and reproducing a lower surface of the optical disc, and a moving table moving the recording and reproducing portion up and down are arranged in a lower side of the tray take-out mechanism, wherein an upper side of the tray take-out mechanism is provided with a cap fixing the optical disc to a rotating portion of the recording and reproducing portion, a floating stabilizing disc stably floating the optical disc provided in the cap, and a moving table moving the cap up and down, wherein the tray is taken out from the cartridge, the optical disc is fixed to the rotating portion of the recording and reproducing portion by moving the recording and reproducing portion and the cap to the optical disc on the tray, and the lower surface of the optical disc is recorded and reproduced. Accordingly, there is obtained an effect that it is possible to obtain the B-side recording and reproducing apparatus having the high reliability, the small size and the high capacity.

Next, there is provided an optical disc recording and reproducing apparatus comprising:

a tray mounting an optical disc thereon;
a cartridge storing a plurality of the trays;
a moving table moving the cartridge up and down; and
a tray take-out mechanism taking out the tray and carrying the optical disc to a recording and reproducing portion, wherein the recording and reproducing portion recording and reproducing a lower surface of the optical disc, and a moving table moving the recording and reproducing portion up and down are arranged in a lower side of the tray take-out mechanism, wherein an upper side of the tray take-out mechanism is provided with a cap fixing the optical disc to a rotating portion of the recording and reproducing portion, a floating stabilizing disc stably floating the optical disc provided in the cap, a disc holding means lifting up the optical disc, and a moving table moving the cap and the disc holding means up and down, wherein the tray is taken out from the cartridge, the optical disc is held by the disc holding means by moving the recording and reproducing portion and the disc holding means to the optical disc on the tray, the disc holding means holding the optical disc and the recording and reproducing portion are moved out of a moving passage of the tray take-out mechanism, the tray is returned to the cartridge by the tray take-out mechanism, and the lower surface of the optical disc is recorded and reproduced after fixing the optical disc of the disc holding means to the rotating portion of the recording and reproducing portion by the cap. Accordingly, there is obtained an effect that it is possible to obtain the B-side recording and reproducing apparatus having the high reliability, the small size and the high capacity.

Next, there is obtained a disc autochanger, wherein the optical disc recording and reproducing apparatus recording and reproducing the upper surface of the optical disc, and the optical disc recording and reproducing apparatus recording and reproducing a lower surface of the optical disc are arranged in a vertical direction, the disc autochanger is provided with a moving table moving the cartridge moving between the two optical disc recording and reproducing apparatuses, and the optical disc is supplied to the two optical disc recording and reproducing apparatuses from the cartridge so as to record and reproduce. Accordingly, there is obtained an effect that it is possible to obtain a high-speed, small-sized and high-capacity disc autochanger using the optical disc in which both surfaces are recorded and reproduced, without any disc reversing mechanism.

Next, there is obtained a disc autochanger, wherein the optical disc recording and reproducing apparatuses recording and reproducing the upper surface of the optical disc are arranged in a vertical direction, the disc autochanger is provided with a moving table moving the cartridge moving between the two optical disc recording and reproducing apparatuses, and the optical disc is supplied to the two optical disc recording and reproducing apparatuses from the cartridge so as to record and reproduce. Accordingly, there is obtained an effect that it is possible to obtain a high-speed, small-sized and high-capacity disc autochanger using the optical disc in which one surface is recorded and reproduced.

Next, there is obtained a disc autochanger, wherein the optical disc recording and reproducing apparatuses recording and reproducing the lower surface of the optical disc are arranged in a vertical direction, the disc autochanger is provided with a moving table moving the cartridge moving between the two optical disc recording and reproducing apparatuses, and the optical disc is supplied to the two optical disc recording and reproducing apparatuses from the cartridge so as to record and reproduce. Accordingly, there is obtained an effect that it is possible to obtain a high-speed, small-sized and high-capacity disc autochanger using the optical disc in which one surface is recorded and reproduced.

Next, the structure is made such that the disc holding means lifting up the optical disc is constituted by an electromagnet, sucks a ring fitted to the cap, and holds the disc between the ring and the electromagnet. Accordingly, it is possible to store the tray in the cartridge, and there is obtained an effect of downsize the recording and reproducing apparatus and the disc autochanger.

Next, the structure is made such that the disc holding means lifting up the optical disc is constituted by an electromagnet, sucks a ring fitted to the rotating portion of the recording and reproducing portion, and holds the disc between the ring and the electromagnet. Accordingly, it is possible to store the tray in the cartridge, and there is obtained an effect of downsize the recording and reproducing apparatus and the disc autochanger.

Next, the ring is structured such that the ring is attached to an outer periphery of a ring of a non-magnetic material. Accordingly, since the magnet sucking the cap embedded is the rotating portion and the ring of the ferromagnetic material are away from each other, there is obtained an effect that they are not sucked.

Next, a hole sucking an air is provided in an inner peripheral side of the floating stabilizing disc. Accordingly, since a negative pressure is generated between the optical disc and the floating stabilizing disc, and the optical disc is rotated keeping a gap with respect to the floating stabilizing disc while being sucked to the floating stabilizing disc side, there is obtained an effect that it is possible to obtain a stable disc having no vibration.

Next, the structure is made such that the floating stabilizing disc is provided with a hole sucking an air in an inner peripheral side, a spacer is provided on the floating stabilizing disc for spacing between the floating stabilizing disc and the optical disc, and the optical disc is installed on the spacer. Accordingly, since a negative pressure is generated between the sheet-like optical disc and the disc, and the sheet-like optical disc is rotated keeping a gap with respect to the disc while being sucked to the disc side, it is known that there is obtained an effect that it is possible to obtain a stable rotation having no vibration.

Next, the structure is made such that a magnet is embedded in an inner peripheral side of the floating stabilizing disc. Accordingly, there is obtained an effect that it is possible to adsorb the ring installed on the floating stabilizing disc.

Next, the structure is made such that a magnet is embedded at a position facing to the optical disc plane in the rotating portion of the recording and reproducing portion. Accordingly, there is obtained an effect that it is possible to adsorb the ring installed to the rotating portion of the recording and reproducing portion.

Next, there is obtained an optical disc recording and reproducing apparatus comprising:

the disc rotating portion provided with a columnar projection to which a clamp hole of the optical disc is inserted;

a cylindrical cap inserted to the columnar projection so as to fix the optical disc; and the columnar projection in which a leading end provided within a cylinder of the cap and having a taper is movable between inner and outer sides of the cylinder, wherein the optical disc is fixed by fitting the cap to the columnar projection of the disc rotating portion after inserting the columnar projection of the cap to the clamp hole of the optical disc.

Accordingly, there is obtained an effect that a displacement of the optical disc is dissolved during the movement of the optical disc to the disc rotating portion. Further, in the case that the optical disc is returned to the tray from the disc rotating portion, there is obtained an effect that the optical disc can be moved in a state of being inserted to the projection of the cap, and can be returned to a predetermined position.

Next, the structure is made such that a concaved notch portion is provided in facing surfaces in an inner side of the cartridge, a convex portion of a separator provided with a convex portion in a pert of the sheet is inserted to the notch portion, the tray having the optical disc inserted to the shelf and the separator are alternately laminated, and the adjacent tray is not taken out together at a time of taking out the tray.

DESCRIPTION OF REFERENCE NUMERALS

1 . . . tray, 3 . . . cover, 5 . . . optical disc, 12 . . . separator, 13 . . . partition plate, 15 . . . moving table guide, 20 . . . disc autochanger, 21 . . . casing, 22 . . . cartridge insertion port, 23 . . . cartridge, 24 . . . cartridge moving table, 25 . . . A-side recording and reproducing portion, 45 . . . B-side recording and reproducing portion, 26, 46 . . . peeling pawl, 27, 47 . . . base, 28, 48 . . . recording and reproducing portion moving table, 29, 49 . . . clamp portion moving table, 30, 50 . . . spindle motor, 31, 51 . . . clamp portion, 32, 52 . . . glass disc, 33, 53 . . . optical portion, 34, 54 . . . optical portion moving mechanism, 35, 55 . . . tray take-out mechanism, 36, 56 . . . cap, 37, 57 . . . electromagnet, 38, 58 . . . floating spacer

DETAILED DESCRIPTION OF THE INVENTION

Embodiment 1

Figure 1:
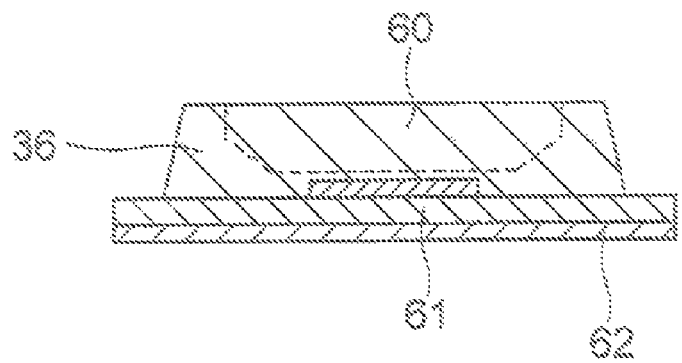
FIG. 1 shows an embodiment of a cap of an A-side recording and reproducing apparatus in accordance with the present invention.
Figure 2:
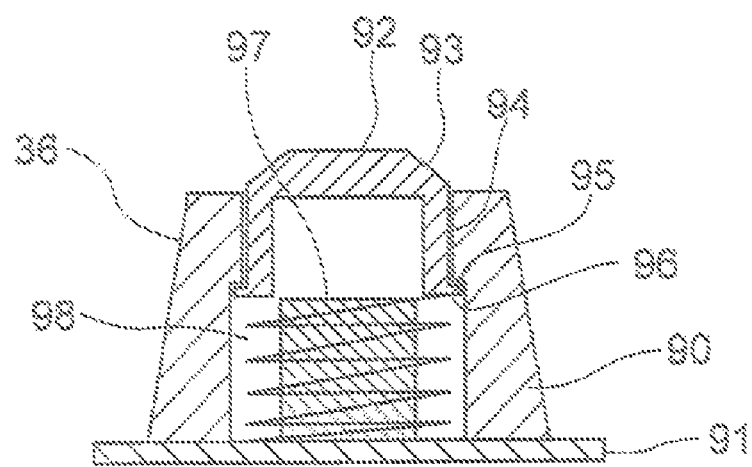
FIG. 2 shows an embodiment of a cap provided with a tapered projection for fixing an optical disc to a disc rotating portion in accordance with the present invention.

First, a description will be given of an embodiment of a disc autochanger 20 to which a cap shown in FIG. 1 or 2 is applied and which supplies an optical disc 5 to an A-side recording and reproducing apparatus and a B-side recording and reproducing apparatus from a cartridge 23 storing a plurality of sheet-like optical discs 5 with reference to FIGS. 3 to 7.

Figure 3:
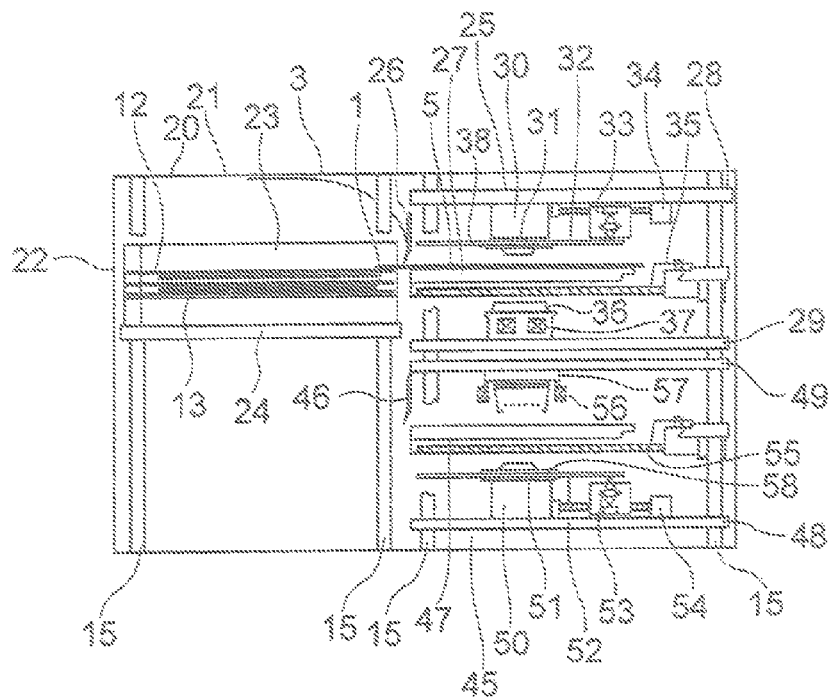
FIG. 3 shows a state in which a tray is taken out to the A-side recording and reproducing apparatus from a cartridge in an embodiment of a disc autochanger to which the cap in accordance with the present invention is applied.

FIG. 3 shows a state in which the cartridge 23 is moved up and down and the optical disc 5 mounted on a designated tray 1 is taken out from the cartridge 23 so as to be carried to the A-side recording and reproducing apparatus.

Figure 4:
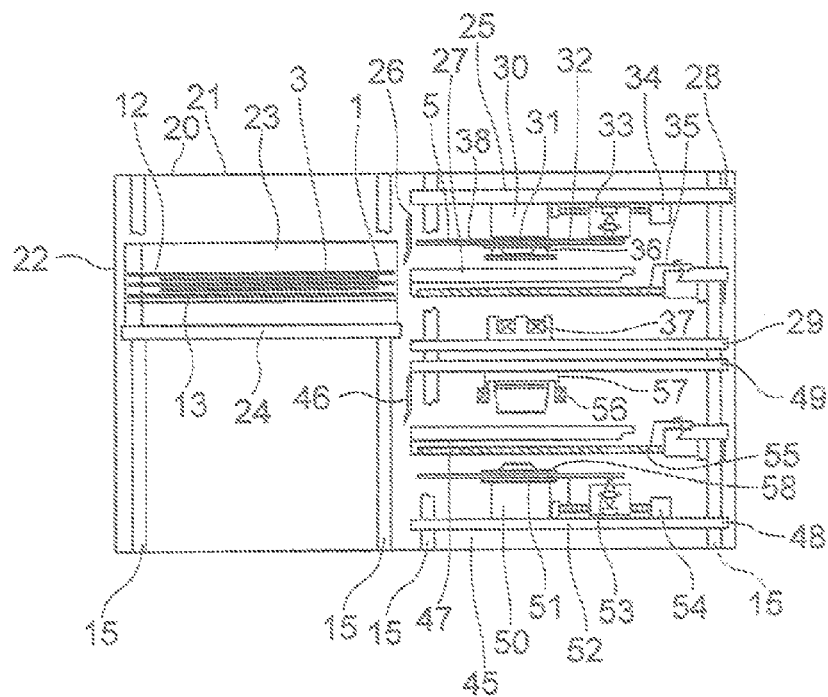
FIG. 4 shows a temporarily evacuated state and a recording and reproducing state of the optical disc in the A-side recording and reproducing apparatus shown in FIG. 3.

FIG. 4 shows a state in which the optical disc 5 is fixed to a clamp portion 31 of a spindle motor 30 of an A-side recording and reproducing portion 25 by a cap 36, and is temporarily evacuated to an upper side, and the tray 1 is returned to the cartridge 23. Thereafter, a recording and reproducing is executed.

Figure 5:
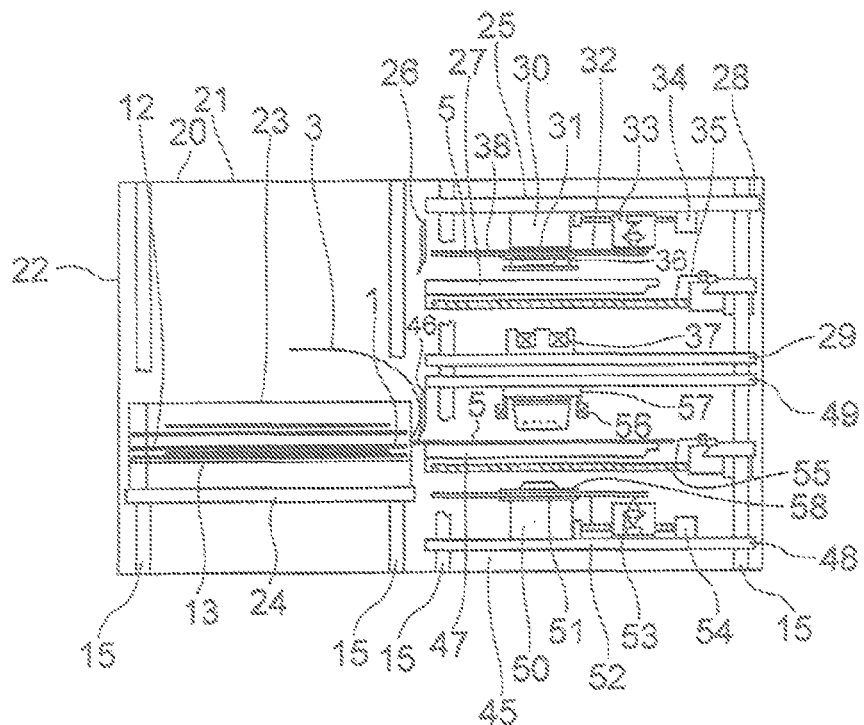
FIG. 5 shows a state in which the tray is taken out to a B-side recording and reproducing apparatus shown in FIG. 3.

FIG. 5 shows a state in which the cartridge 23 is moved up and down, and the optical disc 5 mounted on the other designated tray 1 is taken out from the cartridge 23 so as to be carried to a B-side recording and reproducing apparatus.

Figure 6:
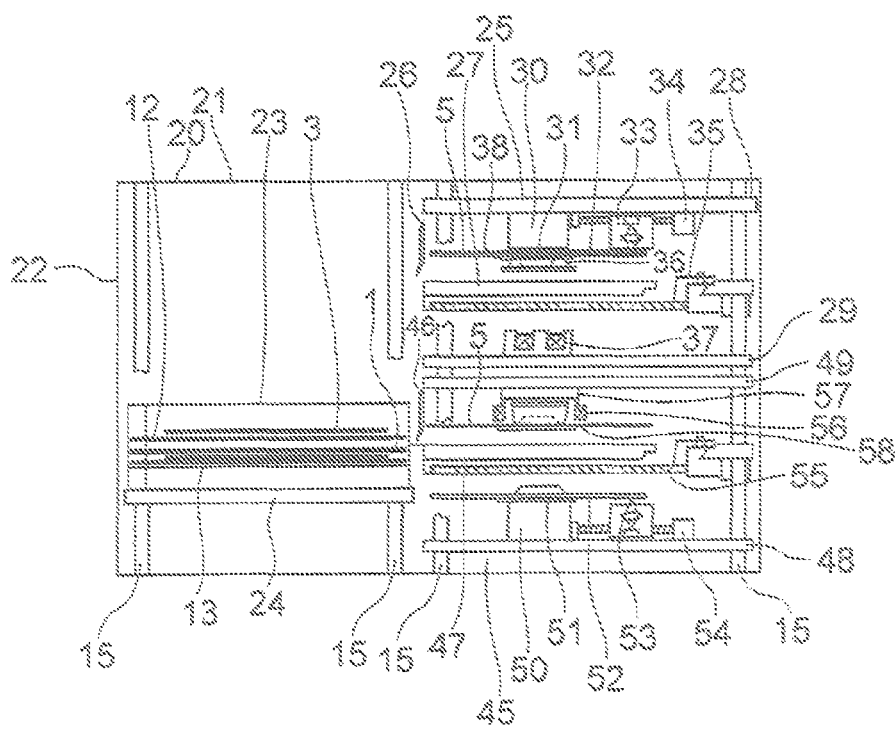
FIG. 6 shows a temporarily evacuated state of the optical disc in the B-side recording and reproducing apparatus shown in FIG. 3.

FIG. 6 shows a state in which the optical disc 5 is sandwiched between an electromagnet 57 and a floating spacer 58 by a magnetic suction force of the electromagnet 57 in a B-side recording and reproducing portion 45, and is temporarily evacuated to an upper side, and the tray 1 is returned to the cartridge 23.

Figure 7:
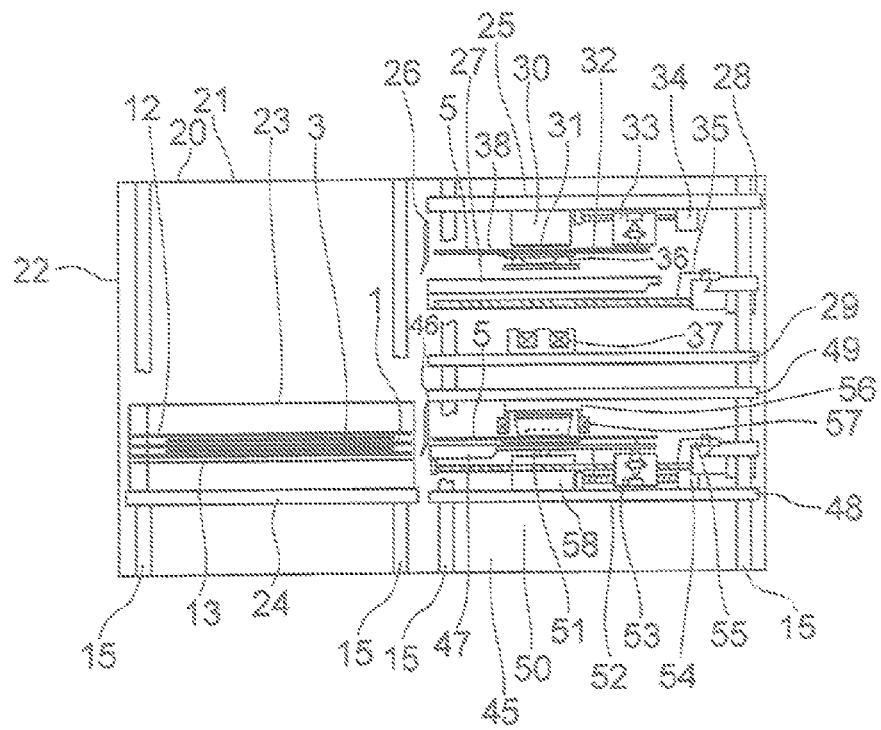
FIG. 7 shows a recording and reproducing state of the optical disc in the B-side recording and reproducing apparatus shown in FIG. 3.

FIG. 7 shows a recording and reproducing state in which the optical disc 5 is fixed to a clamp portion 51 of a spindle motor 50 in the B-side recording and reproducing portion 45 by a cap 56.

First, a description will be given of a structure of the disc autochanger 20 with reference to FIG. 3.

Figure 8:
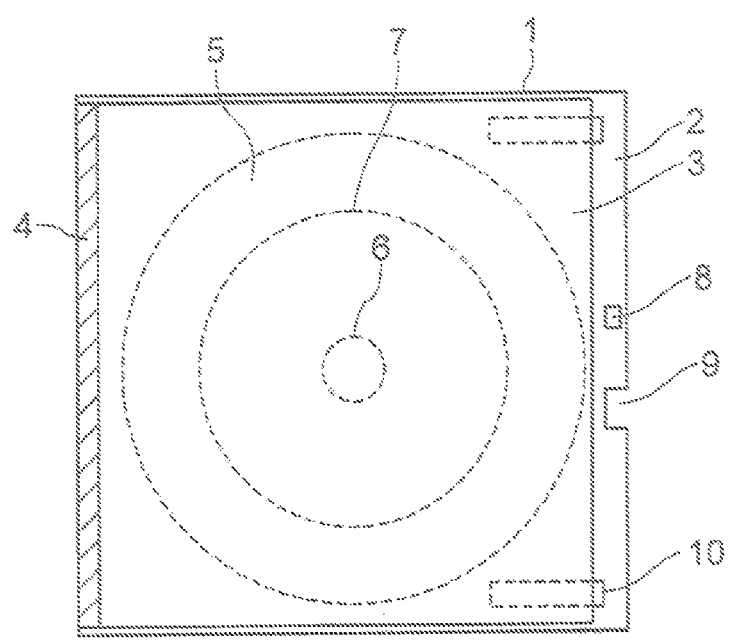
FIG. 8 shows an embodiment of the tray storing the optical disc in accordance with the present invention.

The tray 1 is structured such that the optical disc 5 is inserted between a base member 2 and a cover 3 shown in FIG. 8.

Figure 10:
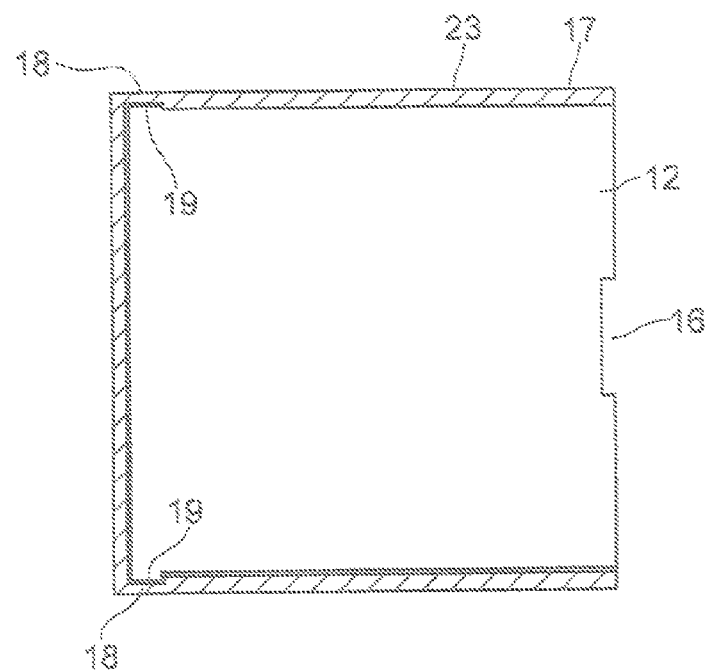
FIG. 10 shows an embodiment of a separator for separating the tray in accordance with the present invention.

The cartridge 23 is structured such that the tray 1 inserting the optical disc 5 thereto and a separator 12 shown in FIG. 10 are alternately laminated, and a partition plate 13 receiving a load of the tray is provided per a fixed number of trays.

A cartridge moving table 24 is structured such as to mount the cartridge 23 thereon so as to move up and down and position the target tray 1 to two recording and reproducing mechanisms.

The A-side recording and reproducing apparatus recording and reproducing the A side of the optical disc 5 is constituted by a tray take-out mechanism 35 for taking out the tray 1, the A-side recording and reproducing portion 25 for recording and reproducing the A side of the optimal disc 5 arranged in an upper side of the tray take-out mechanism 35, an A-side recording and reproducing portion moving table 28 moving the A-side recording and reproducing portion 25 up and down, and a clamp moving table 29 moving a cap 36 for fixing the optical disc 5 arranged in a lower aide of the tray take-out mechanism 35 to the clamp portion 31 of the A-side recording and reproducing portion 25 up and down.

The tray take-out mechanism 35 is constituted by a base 27 for mounting the tray 1 taken out from the cartridge 23 thereon, a horizontal moving mechanism provided in the base 27 and moving in a cartridge direction, and a hook mechanism for hanging a hook on a hook hanging hole 8 provided in the base member 2 of the tray 1 shown in FIG. 8 provided in the horizontal moving mechanism so as take out the tray.

A peeling pawl 26 is provided for peeling the cover 3 of the tray 1 shown in FIG. 8, and is structured such as to push up the cover 3 from a cover lifting hole 10 provided in the base member 2 of the tray 1 shown in FIG. 8 by a projection material in the case that the tray 1 is taken out by the tray take-out mechanism 35, whereby a leading end of the cover is hanged on the peeling pawl 26 so as to be peeled.

The A-side recording and reproducing portion 25 is constituted by the spindle motor 30 for rotating the optical disc 5, the clamp portion 31 provided in the spindle motor 30 for fixing the optical disc 5, a glass disc 32 provided in the clamp portion 31 and provided with an air hole in an inner peripheral side for stably rotating the optical disc 5 without any side runout in such a manner that an air flows to an outer periphery from an inner peripheral side of the glass disc between the optical disc 5 and the glass disc 32, a spacer 38 provided in the glass disc 32 for forming as initial gap between the optical disc 5 and the glass disc 32, an optical portion 33 applying a light to the optical disc 5 so as to read and write an information, and an optical portion moving mechanism 34 moving the optical portion 33 in a radial direction of the disc.

The A-side recording and reproducing portion moving table 28 is structured such as to attach the A-side recording and reproducing portion 25 so as to move up and down.

The clamp moving table 29 is structured such as to attach the cap 36 pulled in by a magnetic suction force of a magnet embedded in the clamp portion 31 and fixing the optical disc 5 to the clamp portion 31, and an electromagnet 37 for adsorbing and separating the cap 36 on the basis of an electromagnetic force so as to move up and down.

A B-side recording and reproducing apparatus recording and reproducing a B side of the optical disc 5 is constituted by a tray take-out mechanism 55 for taking out the tray 1, a B-side recording and reproducing portion 45 for recording and reproducing the B side of the optical disc 5 arranged in a lower side of the tray take-out mechanism 55, a B-side recording and reproducing portion moving table 48 moving the B-side recording and reproducing portion 45 up and down, and a clamp moving table 49 moving a cap 56 for fixing the optical disc 5 arranged in an upper side of the tray take-out mechanism 55 to the clamp portion 51 of the B-side recording and reproducing portion 45 up and down.

The tray take-out mechanism 55 is constituted by a base 47 for mounting the tray 1 taken out from the cartridge 23 thereon, a horizontal moving mechanism provided in the base 47 and moving in a cartridge direction, and a hook mechanism for hanging a hook on a hook hanging hole 8 provided in the base member 2 of the tray 1 shown in FIG. 8 provided in the horizontal moving mechanism so as take out the tray.

A peeling pawl 46 is provided for peeling the coven 3 of the tray 1 shown in FIG. 8, and is structured such as to push up the cover 3 from a cover lifting hole 10 provided in the base member 2 of the tray 1 shown in FIG. 8 by a projection material in the case that the tray 1 is taken out by the tray take-out mechanism 55, whereby a leading end of the cover is hanged on the peeling pawl 46 so as to be peeled.

The B-side recording and reproducing portion 45 is constituted by the spindle motor 50 for rotating the optical disc 5, the clamp portion 51 provided in the spindle motor 50 for fixing the optical disc 5, a glass disc 52 provided in the clamp portion 51 and provided with an air hole in an inner peripheral side for stably rotating the optical disc 5 without any vibration in such a manner that an air flows to an outer periphery from an inner peripheral side of the glass disc between the optical disc 5 and the glass disc 52, a spacer 58 provided in the glass disc 52 for forming an initial gap between the optical disc 5 and the glass disc 52, an optical portion 53 applying a light to the optical disc 5 so as to read and write an information, and an optical portion moving mechanism 54 moving the optical portion 53 in a radial direction of the disc.

The B-side recording and reproducing portion moving table 48 is structured such that the B-side recording and reproducing portion 45 is attached so as to move up and down.

The clamp moving table 49 is structured such as to be provided with the cap 56 pulled in by a magnetic suction force of a magnet embedded in the clamp portion 51 and fixing the optical disc 5 to the clamp portion 51, a cap holder for holding the cap 56 so as to freely move up and down and rotate, and an electromagnet 57 for magnetically sucking a floating spacer 58 by the electromagnet 57 so as to adsorb the optical disc 5 sandwiched therebetween, and move them up and down.

Further, reference numerals 21 and 22 denote a casing of the disc autochanger 20 and an insertion port 22 provided in the casing 21 and inserting the cartridge 23 thereto. Reference numeral 15 denotes a guide of a moving table. The moving table, the tray take-out mechanism and the optical portion moving mechanism are structured such that a power is applied thereto by a driving source (not shown) so as to be movable.

Figure 9:
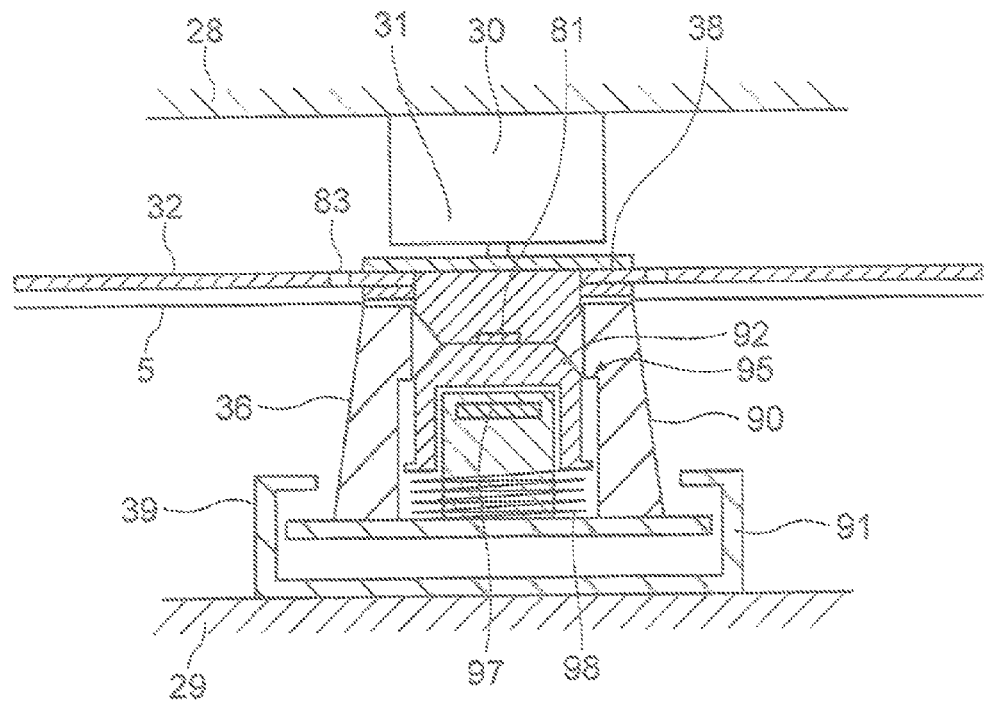
FIG. 9 shows an embodiment in which the cap in FIG. 2 is applied to the A-side recording and reproducing apparatus.

In this case, as an embodiment of a cap fixing the optical disc to the disc rotating portion of the recording and reproducing apparatus using the sheet-like optical disc, there are structures in FIGS. 1, 2 and 9.

FIG. 1 shows an embodiment of the cap 36 of the A-side recording and reproducing apparatus in accordance with the present invention. The cap 36 is constituted by a hole 60 fitted to the clamp portion 31, an iron piece 61 for being sucked by the magnet of the clamp portion 31, and an iron piece 62 for being sucked by the electromagnet 37.

In addition to FIG. 1, it is possible to employ the cap 36 provided with a tapered projection in FIG. 2. FIG. 2 shows an embodiment in which the optical disc 5 is fixed to the disc rotating portion of the A-side recording and reproducing apparatus of the optical disc by the cap 36 in accordance with the present invention. In this case, in FIG. 2, a light beam for reading and recording is input from the disc rotating portion side.

A description will be given below of a structure of the cap 36 provided with the tapered projection in FIG. 2 with reference to FIG. 9. The cap 36 is constituted by a cylindrical cap concave portion 90, a base member 91 to which the cap concave portion 90 is attached, a tapered projection 92 inserted to a claim hole of the optical disc, a taper 93 provided in the tapered projection 92, a sliding portion 94 between the cap concave portion 90 and the tapered projection 92, a spring 98 applying a pressing force to the tapered projection 92, a stopper 95 provided in the cap concave portion 90 for stopping a movement of the tapered projection 92, a step 96 provided in the tapered projection 92 for stopping the tapered projection 92 by the stopper 95, and an iron piece 97 provided in the base member 91 sucked by the magnet of the clamp portion of the spindle motor. Reference numerals 28 and 29 denote a moving table.

Next, a description will be given of an embodiment in which the optical disc 5 is fixed to the disc rotating portion of the A-side recording and reproducing apparatus of the optical disc in FIG. 9 by the cap provided with the tapered projection in accordance with the present invention.

In FIG. 9, the disc rotating portion rotating the optical disc 5 and the cap 36 are arranged so as to face to each other at a distance. The cap 36 is stored so as to be movable in a vertical direction and a horizontal direction by the cap holder 39. The disc rotating portion is constituted by the spindle motor 30 for rotating the optical disc 5, the clamp portion 31 provided in the spindle motor 30 for fixing the optical disc 5, the glass disc 32 provided in the clamp portion 31 and provided with the air hole 83 in the inner peripheral side for stably rotating the optical disc 5 without any side runout in such a manner that the air flows to the outer periphery from the inner peripheral side of the glass disc between the optical disc 5 and the glass disc 32, and the spacer 38 presided in the glass disc 32 for forming the initial gap between the optical disc 5 and the glass disc 32.

Next, a description will be given of an operation for fixing the optical disc 5 mounted on the tray to the disc rotating portion by the cap 36 provided with the tapered projection in FIG. 1 with reference to FIG. 9. If the optical disc 5 mounted on the tray 1 shown in FIG. 8 is inserted to the clamp portion 31 and the cap 36, the cap 36 is moved to an upper side and the tapered projection 92 is inserted to the clamp hole 6 of the optical disc 5. At this time, in the case that the optical disc 5 is deviated from a predetermined position on the tray 1, the optical disc 5 is moved in a direction in which a center of the clamp hole 6 of the optical disc 5 comes into line with a center of the tapered projection 92 by the taper 93 of the tapered projection 92 so as to be inserted to the tapered projection 92. Further, the tapered projection 92 as pressed into the cap concave portion 90 by being brought into contact with the clamp portion 31. Further, the iron piece 97 of the base member 91 is sucked to the magnet 81 of the clamp portion 31 and the optical disc 5 is fixed by the cap concave portion 90 together with the floating spacer 38.

Next, a description will be given of an operation for returning the optical disc 5 to the tray from the disc rotating portion with reference to FIG. 9. The cap 36 is moved in a downward direction, and the clangs portion 31 and the cap 36 are separated. At this time, the optical disc 5 is detached from the clamp portion 31, and the clamp hole is inserted to the tapered projection 92 of the cap 36. The cap 36 mounting the optical disc 5 thereon passes through the tray and it is possible be return the optical disc 5 to the predetermined position of the tray without any displacement. In this case, the present invention can be applied to the optical disc having a thickness of 1.2 mm.

In the case of using the cap 36 provided with the tapered projection in FIG. 2 as mentioned above, there is obtained an effect that even in the case that the optical disc mounted on the tray is deviated from the predetermined position, it is possible to correct the displacement so as to accurately fix the optical disc to the clamp portion of the disc rotating portion. Further, there is obtained an effect that the displacement is not generated during the movement of the disc. Further, there is obtained an effect that the disc is returned to the tray without any displacement.

Next, a description will be given of a recording and reproducing operation of the disc autochanger 20.

First, as shown in FIG. 3, the cartridge moving table 24 is moved, and the designated tray 1 of the cartridge 23 is positioned at the position of the tray take-out mechanism 35 of the A-side recording and reproducing apparatus. Next, the tray take-out mechanism 35 is moved, and the tray 1 is taken out from the cartridge 23 so as to be moved to a position at which the optical disc 5 can be installed to the A-side recording and reproducing portion 25. At this time, the cover 3 is peeled from the tray 1 by the peeling pawl 26. Further, the structure is made such that a part of the tray 1 is left in the cartridge 23 in such a manner as to easily return the tray 1 to the cartridge 23.

Next, as shown in FIG. 4, the A-side recording and reproducing portion moving table 28 is moved in the downward direction so as to insert the clamp portion 31 to the clamp hole 6 of the optical disc 5 mounted on the tray 1 shown in FIG. 8, and the clamp moving table 29 is moved in an upward direction so as to suck the cap 36 on the basis of a magnetic suction force of the magnet in the clamp portion 31 and fit the cap 36 to the clamp portion 31.

(In the case of using the cap 36 provided with the tapered projection in FIG. 2, and in the case that the optical disc 5 is deviated from the predetermined position on the tray 1, the optical disc 5 is moved in a direction in which the center of the clamp hole 6 of the optical disc 5 comes into line with the center of the tapered projection 92 by the taper 93 of the tapered projection 92 so as to be inserted to the tapered projection 92. Further, the tapered projection 92 is pressed into the cap concave portion 90 by being brought into contact with the clamp portion 31.)

Accordingly, the optical case 5 is fixed to the clamp portion 31. Since the current application of the electromagnet 37 is stopped at this time, the cap 36 and the electromagnet 37 are in a state 3 of being separated from each other. Next, the A-side recording and reproducing portion moving table 28 is moved in the upward direction so as to be stopped at a position at which the A-side recording and reproducing portion moving table 28 does not come into collision with the tray take-out mechanism 35. In the same manner, the clamp moving table 29 is moved in the downward direction so as to be stopped at a position at which the clamp moving table 29 does not come into collision with the tray take-out mechanism 35. Next, the tray take-out mechanism 35 is moved so as to press the tray 1 to the cartridge 23. Accordingly, the cartridge moving table 24 can move the cartridge 23 to the B-side recording and reproducing mechanism. Thereafter, the recording and reproducing of the A side is executed.

Next, as shown in FIG. 5, the cartridge moving table 24 is moved and the designated tray 1 of the cartridge 23 is positioned at the position of the tray take-out mechanism 55 of the B-side recording and reproducing apparatus. Next, the tray take-out mechanism 55 is moved so as to take out the tray 1 from the cartridge 23 and move the tray 1 at a position at which the optical disc 5 can be installed to the B-side recording and reproducing portion 45. At this time, the cover 3 is peeled from the tray 1 by the peeling pawl 46. Further, the structure is made such that a part of the tray 1 is left in the cartridge 23 in such a manner as to easily return the tray 1 to the cartridge 23.

Next, as shown on FIG. 6, the B-side recording and reproducing portion moving table 48 is moved in the upward direction so as to insert the clamp portion 51 to the clamp hole 6 of the optical disc 5 mounted on the tray 1 shown in FIG. 8, and the clamp moving table 49 is moved in the downward direction so as to excite the electromagnet 57 and suck the floating spacer 58 to the electromagnet 57 on the basis of the magnetic suction force. Accordingly, the optical disc 5 sandwiched between the electromagnet 57 and the floating spacer 58 is adsorbed to the electromagnet 57.

(In the case of using the cap 36 provided with the tapered projection in FIG. 2, and in the case that the optical disc 5 is deviated from the predetermined position on the tray 1, the optical disc 5 is moved in a direction in which the center of the clamp hole 6 of the optical disc 5 comes into line with the center of the clamp portion 51 so as to be inserted to the clamp portion 51.)

Next, the B-side recording and reproducing portion moving table 48 is moved in the downward direction so as to be stopped at a position at which the B-side recording and reproducing portion moving table 48 does not come into collision with the tray take-out mechanism 55. In the same manner, the clamp moving table 49 is moved in the upward direction so as to be sopped at a position at which the clamp moving table 49 does not come into collision with the tray take-out mechanism 55.

(In the case of using the cap 36 provided with the tapered projection, since the optical disc 5 and the floating spacer 58 are inserted to the tapered projection 92 of the cap 56, they are to the center of the cap 56 in a state in which the displacement does not exist.)

Next, the tray take-out mechanism 55 is moved so as to press the tray 1 to the cartridge 23. Accordingly, the cartridge moving table 24 can move the cartridge 23 to the A-side recording and reproducing mechanism.

Next, as shown in FIG. 7, the clamp moving table 49 is moved in the downward direction so as to be stopped near the base 47. Next, the B-side recording and reproducing portion moving table 48 is moved in the upward direction so as to insert the clamp portion 51 to the clamp hole 6 of the optical disc 5, and the cap 56 is sucked to the cap 56 on the basis of the suction force of the magnet of the clamp portion 51 so as to be fitted to the clamp portion 51.

(In the case of using the cap 36 provided with the tapered projection, since the centers of the optical disc 5 and the floating spacer 58 are positioned at the center of the cap 56 by the tapered projection 92 of the cap 56, it is possible to accurately fit them to the clamp portion 51.)

Next, the current application of the electromagnet 57 is stopped. Accordingly, the optical disc 5 and the floating spacer 58 are fixed to the clamp portion 51. Thereafter, the clamp moving table 49 and the electromagnet 57 are moved so as to set the cap 56 and the electromagnet 57 in a freely movable state, and the recording and reproducing of the B side is executed.

Next, a description will be given of an operation for returning the optical disc 5 of the A-side recording and reproducing apparatus to the cartridge 23. An operation returning as a state in FIG. 3 from a state in FIG. 4 corresponds to the returning operation. As shown in FIG. 3, the cartridge moving table 24 is moved so as to position the designated tray 1 of the cartridge 23 at the position of the tray take-out mechanism 35 of the A-side recording and reproducing apparatus. Next, the tray take-out mechanism 35 is moved so as to take out the tray 1 from the cartridge 23 and move the tray 1 to a position capable of receiving the optical disc 5 from the A-side recording and reproducing portion 25. At this time, the cover 3 is peeled from the tray 1 by the peeling pawl 26. Further, the structure is made such that a part of the tray 1 is left in the cartridge 23 in such a manner as to easily return the tray 1 to the cartridge 23. Next, the A-side recording and reproducing portion moving table 28 is moved in the downward direction so as to stop the optical disc 5 near the tray 1. Next, the clamp moving table 29 is moved in the upward direction so as to excite the electromagnet 36 and adsorb the cap 36. Next, the clamp moving table 29 is moved in the downward direction so as to be stopped at a position at which the clamp moving table 29 does not come into collision with the tray take-out mechanism 35. Next, the current application of the electromagnet 37 is turned off so as to make the cap 36 freely movable. In the same manner, the A-side recording and reproducing portion moving table 28 is moved in the upward direction so as to be stopped at a position at which the A-side recording and reproducing portion moving table 28 does not come into collision with the tray take-out mechanism 35. Accordingly, the optical disc 5 is returned onto the tray 1.

(In the case of using the cap 36 provided with the tapered projection in FIG. 2, the optical disc 5 is thereby detached from the clamp portion 31, and the clamp hole is inserted to the tapered projection 92 of the cap 36. The cap 36 mounting the optical disc 5 thereon passes through the tray and can return the optical case 5 to the predetermined position of the trap without any displacement.)

Next, the tray take-out mechanism 35 is moved so as to press the tray 1 to the cartridge 23. At this time, the cover 3 is put on the optical disc 5.

Next, a description will be given of a returning operation for returning the optical disc 5 of the B-side recording and reproducing apparatus to the cartridge 23. An operation returning to a state in FIG. 5 from a state in FIG. 7 via a state in FIG. 6 corresponds to the returning operation. As shown in FIG. 6, the electromagnet 57 is excited and the floating spacer 58 is sucked to the electromagnet 57 on the basis of the magnetic suction force. Accordingly, the optical disc 5 sandwiched between the electromagnet 57 and the floating spacer 58 is fixed to the electromagnet 57. Next, the B-side recording and reproducing portion moving table 48 is moved in the downward direction so as to be stopped at a position at which the B-side recording and reproducing portion moving table 48 does not come into collision with the tray take-out mechanism 55. In the same manner, the clamp moving table 49 is moved in the upward direction so as to be stopped at a position at which the clamp moving table 49 does not come into collision with the tray take-out mechanism 55. Next, as shown in FIG. 5, the cartridge moving table 24 is moved so as to position the designated tray 1 of the cartridge 23 at the position of the tray take-out mechanism 55 of the B-side recording and reproducing apparatus. Next, the tray take-out mechanism 55 is moved so as to be moved to a position at which the tray 1 can be taken out from the cartridge 23 and the optical disc 5 can be received from the B-side recording and reproducing portion 45. At this time, the cover 3 is peeled from the tray 1 by the peeling pawl 46. Further, the structure is made such that a part of the tray is left in the cartridge 23 in such a manner as to easily return the tray 1 to the cartridge 23. Next, the clamp moving table 49 is moved in the downward direction so as to stop the optical disc 5 near the tray 1. Next, the B-side recording and reproducing portion moving table 48 is moved in the upward direction so as to insert the clamp portion 51 to the clamp hole 6 of the optical disc 5, and is sucked to the cap 56 on the basis of the suction force of the magnet of the clamp portion 51 so as to be fitted to the clamp portion 51. Next, the current application of the electromagnet 57 is stopped. Next, the B-side recording and reproducing portion moving table 48 is moved in the downward direction so as to be stopped at a position at which the B-side recording and reproducing portion moving table 48 does not come into collision with the tray take-out mechanism 55. Next, the clamp moving table 49 is moved in the upward direction so as to be stopped at a position at which the clamp moving table 49 does not come into collision with the tray take-out mechanism 55. Accordingly, the optical disc 5 is returned to the tray 1, and the floating spacer 58 is returned to the clamp portion 51. Next, the tray take-out mechanism 55 is moved so as to press the tray 1 to the cartridge 23. At this time, the cover 3 is put on the optical disc 5.

Next, table 1 shows an embodiment of a disc take-out order for continuously executing the recording and reproducing operation by using the disc autochanger 20 and the sheet-like both-surface recording and reproducing optical disc. A storage disc number indicates a number of a storage position from an upper side or a lower side of the optical disc stored in the cartridge 23. As mentioned above, it is possible to execute the continuous recording and reproducing by repeating the recording and reproducing of three optical discs which are set as one unit.

TABLE 1

| | recording and reproducing order | | | |
|---|---|---|---|---|
| | 1 | 2 | 3 | 4 |
| storage disc No. | A side in first disc | B side in second disc | A side in third disc | B side in first disc |
| used recording and reproducing apparatus | A apparatus | B apparatus | A apparatus | B apparatus |

| | recording and reproducing order | | | |
|---|---|---|---|---|
| | 5 | 6 | 7 | 8 |
| storage disc No. | A side in second disc | B side in second disc | A side in fourth disc | B side in fifth disc |
| used recording and reproducing apparatus | A apparatus | B apparatus | A apparatus | B apparatus |

Further, one example of the sheet-like optical disc is obtained by forming a recording layer on A side of a base material such as a polycarbonate resin, a polyester resin or the like having a thickness of about 0.05 mm to 0.1 mm, and can be recorded and reproduced in accordance with a format of a standard CD, DVD or the like. About 100 sheet-like optical discs are stored in the cartridge. Further, the recording and reproducing portion can use a commercially available recording and reproducing apparatus for CD, DVD or the like. Further, a thickness of the glass disc is preferably set to about 0.5 mm to 0.6 mm.

Further, in the description mentioned above, the description is given of the sheet-like both-surface recording sod reproducing optical disc, however, it is possible to record and reproduce a one-surface optical disc. Further, it is possible to handle the optical disc having the standard thickness such as the CD, DVD or the like. In this case, it is necessary to omit the glass disc and the floating spacer in the A-side recording and reproducing apparatus. It is necessary to omit only the glass disc in the B-side recording and reproducing apparatus.

As mentioned above, in accordance with the present invention, there is obtained an effect that it is possible to execute the continuous recording and reproducing while using the optical discs stored in one cartridge by supplying the optical discs to the A-side recording and reproducing apparatus and the B-side recording and reproducing apparatus from the cartridge storing a plurality of both-surface recording and reproducing optical discs put in the tray so as to fix the optical disc to the recording and reproducing apparatus, and thereafter returning the tray to the cartridge. Further, there is obtained an effect that it is possible to improve a transfer rate by operating the A-side recording and reproducing apparatus and the B-side recording and reproducing apparatus in parallel while using the optical discs stored in one cartridge.

Further, there is obtained an effect that it is possible to independently use the A-side recording and reproducing apparatus and the B-side re-cording and reproducing apparatus.

FIG. 8 shows an embodiment of the tray 1 in accordance with the present invention. The tray 1 is constituted by the sheet-like base member 2 forming a base, the sheet-like cover 3 for preventing the sheet-like optical case 5 from moving and for preventing the optical disc 5 from scuffing, an adhesion portion 4 adhering the cover 3 and the base member 2, the clamp hole 6 formed in the center of the optical disc 5, a through hole 7 through which the clamp portions 31 and 51 and the caps 36 and 56 shown in FIG. 3 formed in the base member 2 can pass, a hook hole 8 formed in the base member 2 and hanging a hook for taking out the tray, a hook runoff portion 9 structured such as to prevent the hook from being brought into contact with the adjacent tray at a time of taking out the tray, and a cover lifting hole 10 for passing a projection material for lifting up the cover at a tame of peeling the cover 5 therethrough.

FIG. 10 shows an embodiment of the separator 12 in accordance with the present invention. The separator 12 is provided with a hook runoff portion 16 provided in the sheet-like base member, and a projection portion 19 for preventing from being taken out from the cartridge 23, and is structured such that the separator 12 can move in a vertical direction to a paper surface by inserting the projection portion 19 to a notch portion 18 provided in a side plate 17 of the cartridge 23, but does not move in a direction of being taken out from the cartridge 23. The is obtained an effect since the separator 12 and the tray 1 are alternately laminated, the adjacent tray is not taken out together with the tray 1 at a time of taking out the tray 1.

Figure 11:
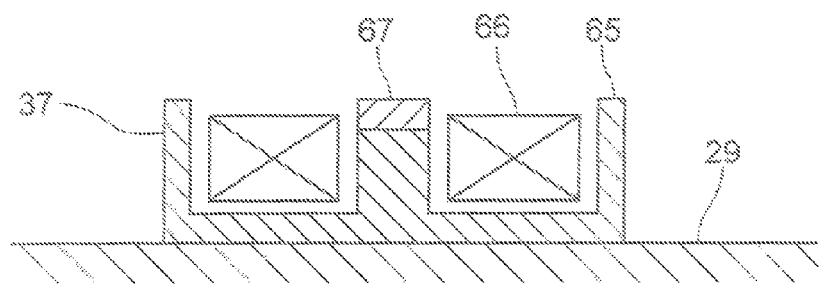
FIG. 11 shows an embodiment of an electromagnet for adsorbing and separating the cap of the A-side recording and reproducing apparatus in accordance with the present intention.

FIG. 11 shows an embodiment of the electromagnet 37 for adsorbing and separating the cap 36 of the A-side recording and reproducing apparatus in accordance with the present invention. The electromagnet 37 is constituted by a cylindrical yoke 65, a coil 66 wound around a pole of the cylindrical yoke, and a magnet 67 for obtaining a holding force. In the case of sucking the cap 36, the coil 66 is excited. Further, in the case of detaching the cap 36, the current application of the coil 66 is stopped, or the direction of the current applied to the coil 66 is inverted for canceling the holding force of the magnet 67. In this case, the magnet 67 can be omitted.

As mentioned above, in accordance with the present invention, since it is possible to hold the cap 36 on the basis of the adsorption and separation of the cap 36 by the electromagnet, and the suction force of the magnet 67 even in the case that the current application is shut off, there is obtained an effect that the cap 36 does not come down from the electromagnet 67 at a time when the vibration is applied.

Figure 12:
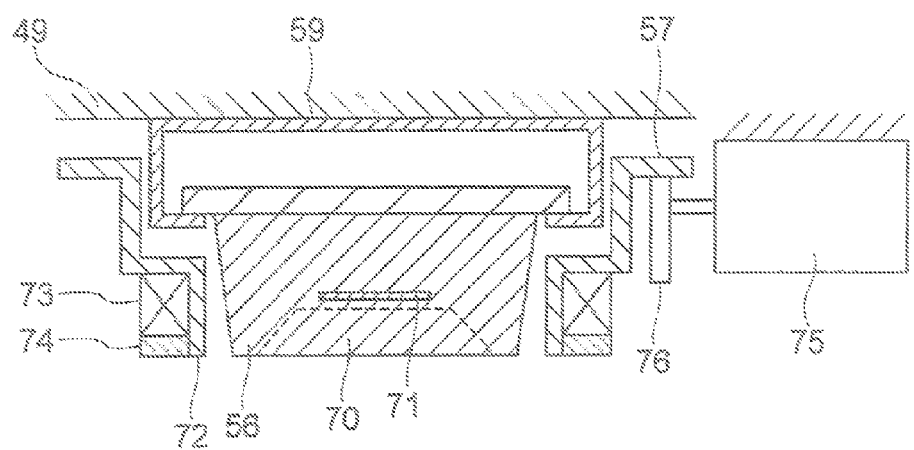
FIG. 12 shows an embodiment of an electromagnet for adsorbing and separating the optical disc in the B-side recording and reproducing apparatus in accordance with the present intention.

FIG. 12 shows as embodiment of the cap 56 and the electromagnet 57 of the B-side recording and reproducing apparatus in accordance with the present invention. The cap 56 is stored in such a manner as to be movable in a vertical direction and a horizontal direction by a cap holder 59. Further, the cap 56 is constituted by a hole 70 fitted to the clamp portion 51, and an iron piece 71 for being sucked to the magnet of the clamp portion 51.

The electromagnet 57 is structured such as to suck the floating spacer 58 and adsorb the optical disc 5 sandwiched therebetween to the electric magnet 57. Further, the electromagnet 57 is constituted by a coil 73 provided in an outer side of the cap holder 59 and wound around a yoke 72, a magnet 74 for obtaining a holding force, a motor 75 for moving the electromagnet 57 in the vertical direction, and an eccentric cam 76 attached to a shaft of the motor 75.

Further, in the case of adsorbing the optical disc 5, the motor 75 is moved so as to set a bottom surface of the yoke 72 at the same height or lower than a bottom surface of the cap 56 and insert to the clamp portion 51, and adsorbs the optical disc 5 by exciting the coil 73. The magnet 74 is structured such that the magnet 74 can keep the adsorption of the optical disc 5 even in the case that the current application of the coil 73 is turned off.

Further, in the case of detaching the optical disc 5 from the yoke 72, the current application of the coil 73 is stopped, or the direction of the current applied to the coil 73 is inverted for canceling the holding force of the magnet 74.

Further, in the case of rotating the cap 56 at a time of recording and reproducing, the cap holder 59 is moved to a position at which the cap 56 does not come into contact with the cap holder 59, and the motor 75 is moved so as to be moved at a position at which the bottom surface of the yoke 72 does not come into contact with the optical disc 5.

Further, in the case of sucking the optical disc 5 by sandwiching the optical disc 5 by the electromagnet 57 and the floating spacer 58 so as to detach from the clamp portion 51, the cap holder 59 is moved to a position at which the cap 56 comes into contact with the bottom of the cap holder 59, and the motor 75 is moved so as to move the bottom surface of the yoke 72 to the same height as the bottom surface of the cap 56 and detach the cap 56 from the clamp portion 51. In this case, the magnet 74 can be omitted.

As mentioned above, in accordance with the present invention, since the electromagnet 57 which can move up and down is provided in the outer side of the cap holder 59, and the optical disc 5 can be adsorbed to the electromagnet 57 while sandwiching the optical disc 5 between the floating spacer 58 and the electromagnet 57, there is obtained an effect that the optical disc 5 can be lifted up and returned from the clamp portion 51.

Figure 13:
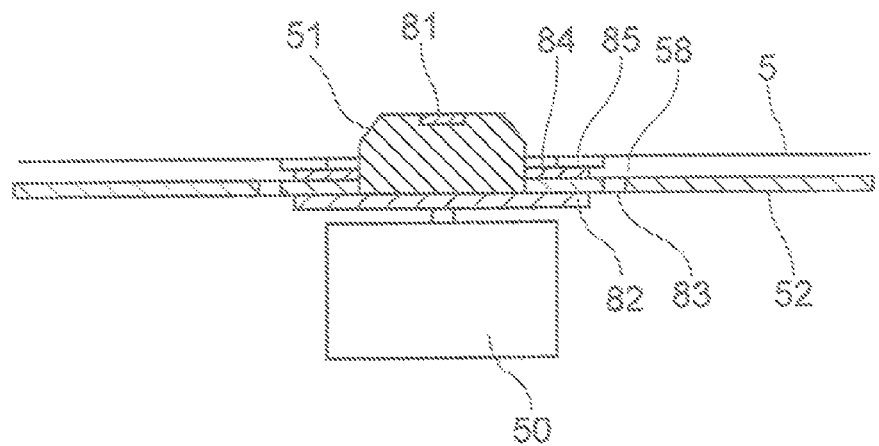
FIG. 13 shows an embodiment of a floating spacer of the B-side recording and reproducing apparatus in accordance with the present invention.
Figure 14:
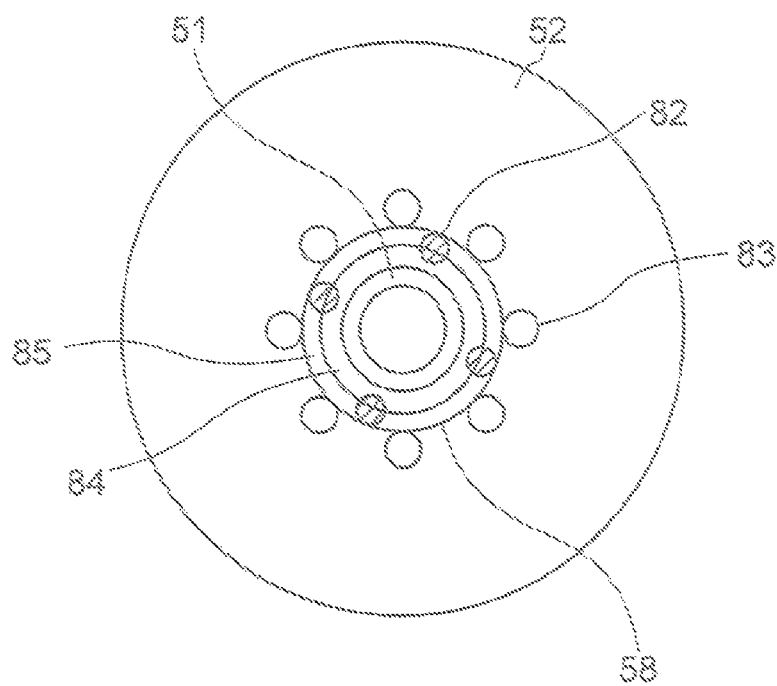
FIG. 14 shows an embodiment of a glass disc of the B-side recording and reproducing apparatus in accordance with the present invention.

FIGS. 13 and 14 show an embodiment of the floating spacer 58 and the glass disc 52 of the B-side recording and reproducing apparatus in accordance with the present intention. FIGS. 13 and 14 show the spindle motor 50, the clamp portion 51 attached to the spindle motor 50, the magnet 81 embedded in the clamp portion 51, the glass disc 52 attached to the clamp portion 51, the magnet 82 embedded in the glass disc 52, the air hole 83 formed in the glass disc 52 for sucking the air, the floating spacer 58 constituted by a ring 84 of a non-magnetic material fitted to the clamp portion 51 and a ring 85 of a ferromagnetic material attached to an outer peripheral portion of the ring 84, and the optical disc 5 mounted on the floating spacer 58.

As mentioned above, in accordance with the present invention, since the ring 85 of the ferromagnetic material is attached to the outer peripheral portion of the ring 84 of the non-magnetic material, it is possible to make the magnet 81 and the ring 85 of the ferromagnetic material away from each other. Accordingly, there is obtained an effect that the ring 85 of the ferromagnetic material can be lifted and returned from the clamp portion 51 without being adsorbed to the magnet 81.

Further, since the air hole 83 for sucking the air is provided in the inner periphery of the glass disc 52, the air sucked from the air hole 83 in accordance with the rotation of the glass disc 52 flows toward the outer peripheral side. Accordingly, a negative pressure is generated between the optical disc 5, the glass disc 52 and the optical disc 5 is sucked to the glass disc 52 side, and there is obtained an effect that it is possible to obtain a stable rotation without any side runout in a state in which the optical disc 5 does not come into contact with the glass disc 52.

Further, since the magnet 82 is embedded in the glass disc 52, it is possible to suck and hold the floating spacer 58. Accordingly, there is obtained an effect that it is possible to lift and return the floating spacer 58 from the clamp portion 51.

Further, it is possible to embed the magnet 82 in the clamp portion 51. The same effect can be obtained in this case.

Embodiment 2

A description will be given of an embodiment of the disc autochanger 20 with no disc reversing mechanism, which supplies the sheet-like optical disc 5 in which both surfaces are recorded and reproduced to the A-side recording and reproducing apparatus and the B-side recording and reproducing apparatus from the cartridge 23 storing a plurality of sheet-like optical discs 5 with reference to FIGS. 15 to 20.

FIG. 5 shows a state in which the cartridge 23 is moved up and down and the optical disc 5 mounted on a designated tray 1 is taken out from the cartridge 23 so as to be carried to the A-side recording and reproducing apparatus.

Figure 16:
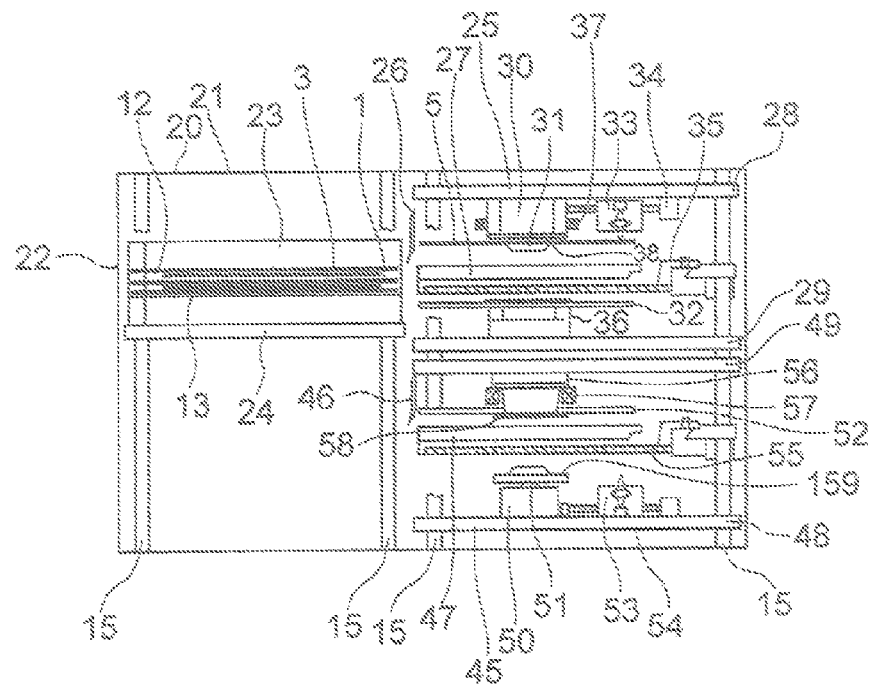
FIG. 16 shows a temporarily evacuated state of the optical disc in the A-side recording and reproducing apparatus shown in FIG. 1.

FIG. 16 shows a state in which the optical disc 5 is sandwiched between the clamp portion 31 and the floating spacer 38 on the basis of the magnetic suction force of the electromagnet 37 of the A-side recording and reproducing apparatus 25, and is temporarily evacuated to the upper side, and the tray 1 is returned to the cartridge 23.

Figure 17:
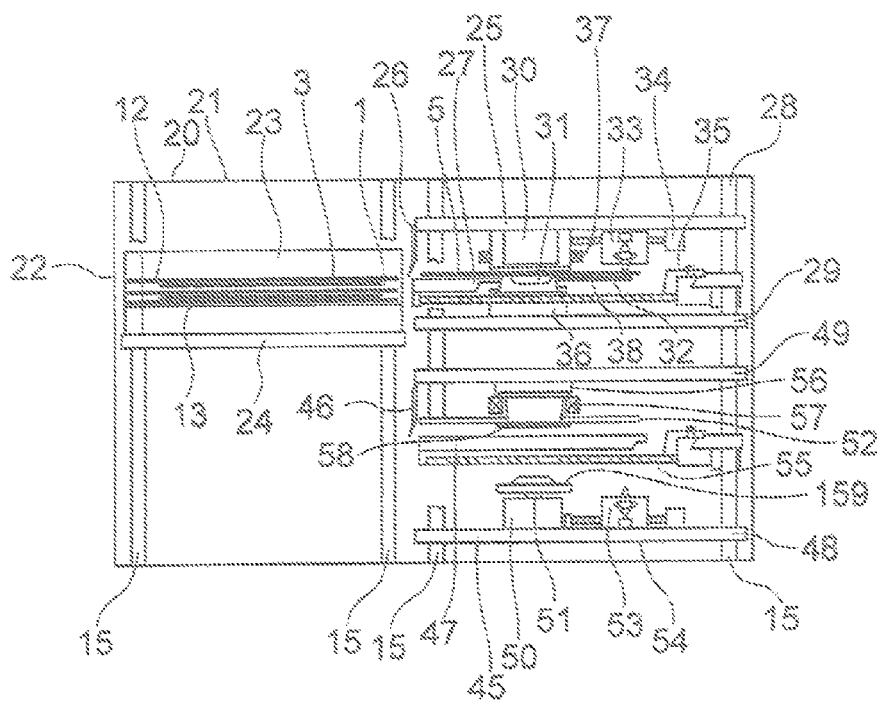
FIG. 17 shows a recording and reproducing state of the optical disc in the A-side recording and reproducing apparatus shown in FIG. 1.

FIG. 17 shows a recording and reproducing state in which the optical disc 5 is fixed to the clamp portion 31 of a spindle motor 30 of an A-side recording and reproducing portion 25 by the cap 36 provided with the floating stabling disc 32.

Figure 18:
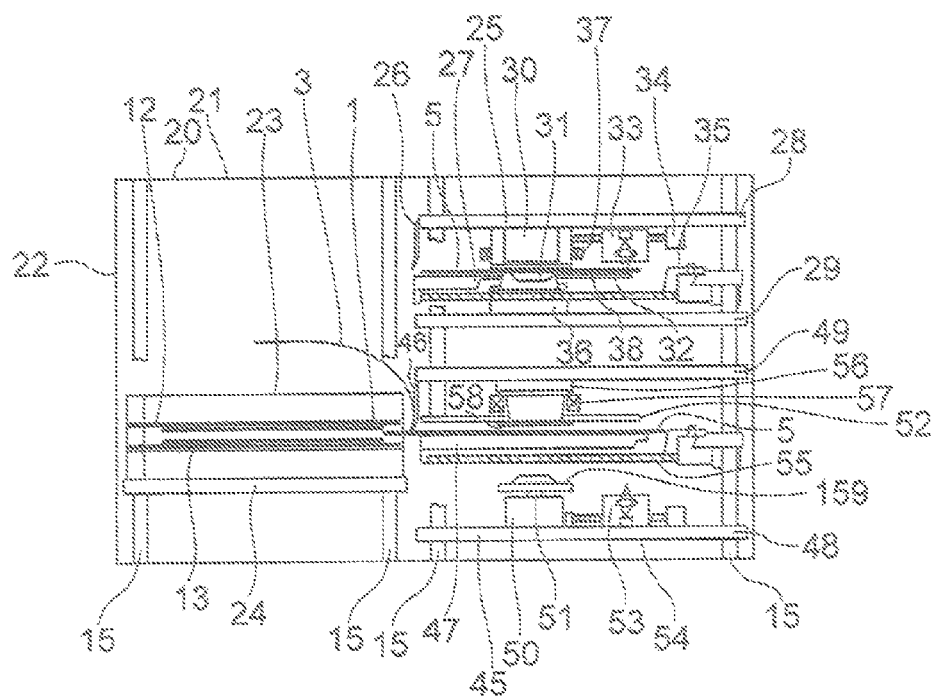
FIG. 18 shows a state in which the tray is taken out to the B-side recording and reproducing apparatus shown in FIG. 1.

FIG. 18 shows a state in which the cartridge 23 is moved up and down, and the optical disc 5 mounted on the other designated tray 1 is taken out from the cartridge 23 so as to be carried to a B-side recording and reproducing apparatus.

Figure 19:
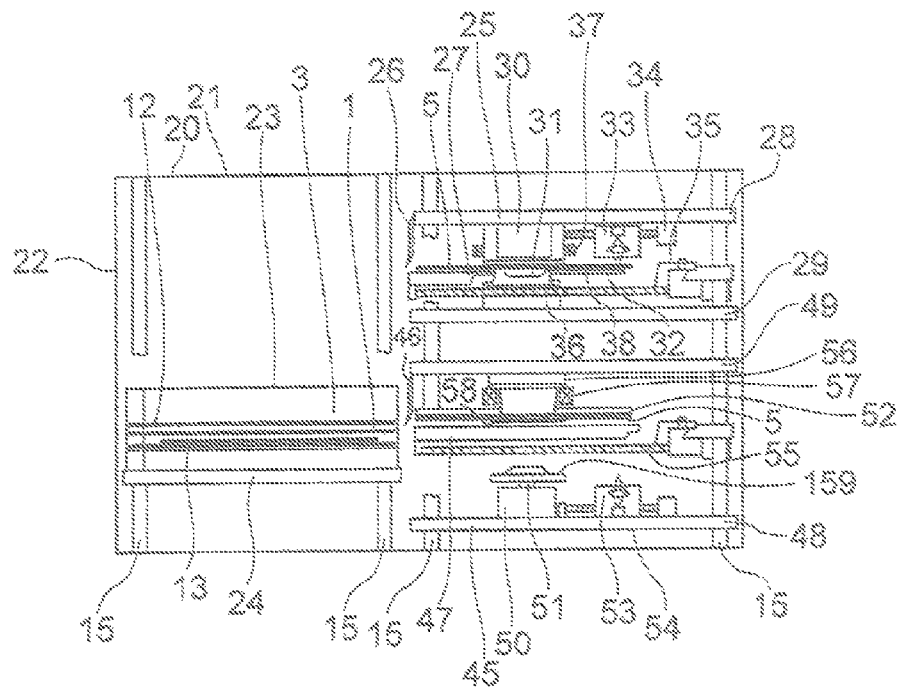
FIG. 19 shows a temporarily evacuated state of the optical disc in the B-side recording and reproducing apparatus shown in FIG. 1.

FIG. 19 shows a state in which the optical disc 5 is sandwiched between the cap 56 and an adsorption ring 159 by the magnetic suction force of the electromagnet 57, and is temporarily evacuated to the upper side, and the tray 1 is returned to the cartridge 23.

Figure 20:
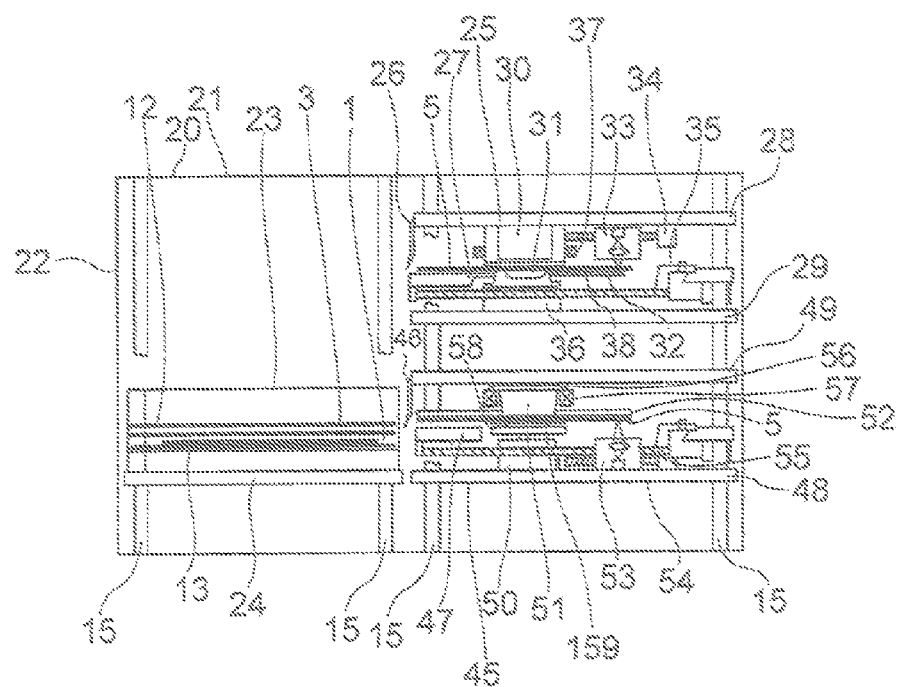
FIG. 20 shows a recording and reproducing state of the optical disc in the B-side recording and reproducing apparatus shown in FIG. 1.

FIG. 20 shows a recording and reproducing state in which the optical disc 5 is fixed to the clamp portion 51 of the spindle motor 50 in the B-side recording and reproducing portion 45 by the cap 56 provided with the floating stabilizing disc 52.

First, a description will be given of a structure of the disc autochanger 20 with reference to FIG. 15.

The tray 1 is structured such that the optical disc 5 is inserted between a base member 2 and a cover 3 shown in FIG. 8.

The cartridge 23 is structured such that the tray 1 inserting the optical disc 5 thereto and the separator 12 shown in FIG. 10 are alternately laminated, and the partition plate 13 receiving a load of the tray is provided per a fixed number of trays.

The cartridge moving table 24 is structured such as to mount the cartridge 23 thereon so as to move up and down and position the target tray 1 to the A-side and B-side recording and reproducing apparatuses.

The A-side recording and reproducing apparatus recording and reproducing the A side of the optical disc 5 is constituted by the tray take-out mechanism 35 for taking out the tray 1, the A-side recording and reproducing portion 25 for recording and reproducing the A side of the optical disc 5 arranged in an upper side of the tray take-out mechanism 35, the A-side recording see reproducing portion moving table 28 moving the A-side recording and reproducing portion 25 up and down, and the clamp moving table 29 moving the cap 36 for fixing the optical disc 5 arranged in a lower side of the tray take-out mechanism 35 to the clamp portion 31 of the A-side recording and reproducing portion 25 up and down.

Figure 21:
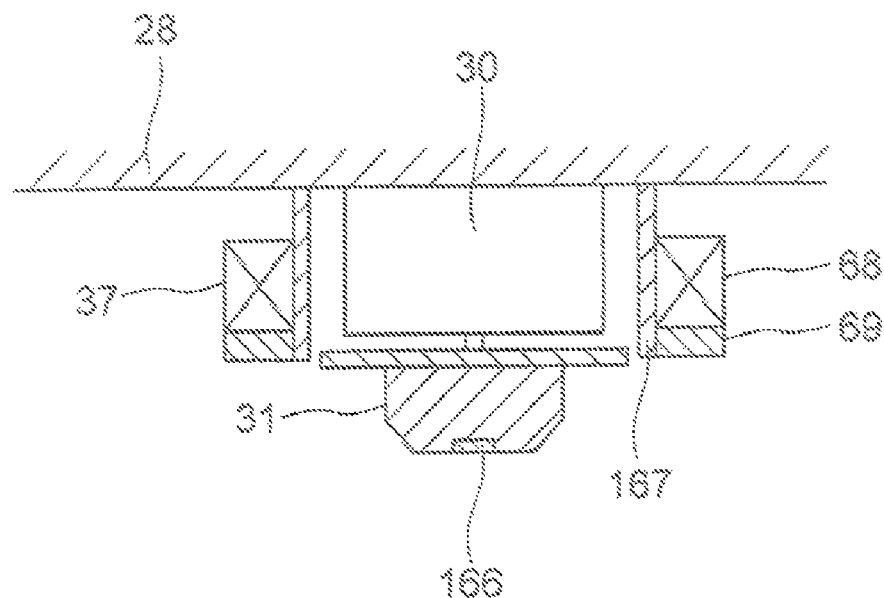
FIG. 21 shows an embodiment of an electromagnet for sucking and holding the optical disc in the A-side recording and reproducing apparatus in accordance with the present invention.

The tray take-out mechanism 35 is constituted by a horizontal moving mechanism provided in the base 27 for mounting the tray 1 taken out from the cartridge 23 thereon and moving in the cartridge direction, and a hook mechanism for hanging a hook on the hook hanging hole 8 provided in the base member 2 of the tray 1 shown in FIG. 21 provided in the horizontal moving mechanism so as take out the tray.

The peeling pawl 26 is provided for peeling the cover 3 of the tray 1 shown in FIG. 8, and is structured such as to push up the cover 3 from the cover lifting hole 10 provided in the base member 2 of the tray 1 shown in FIG. 8 by the projection material in the case that the tray 1 is taken out by the tray take-out mechanism 35, whereby the leading end of the cover is hanged on the peeling pawl 26 so as to be peeled.

The A-side recording and reproducing portion 25 is constituted by the spindle motor 30 for rotating the optical disc 5, the clamp portion 31 provided in the spindle motor 30 for fixing the optical disc 5, the electromagnet 37 magnetically sucking the floating spacer 38 by the electromagnet 37 and adsorbing the sandwiched optical disc 5 to the clamp portion 31, the optical portion 33 applying the light to the optical disc 5 so as to read and write the information, and the optical portion moving mechanism 34 moving the optical portion 33 in the radial direction or the disc.

The A-side recording and reproducing portion mooing table 28 is structured such as to attach the A-side recording and reproducing portion 25 so as to move up and down.

Figure 22:
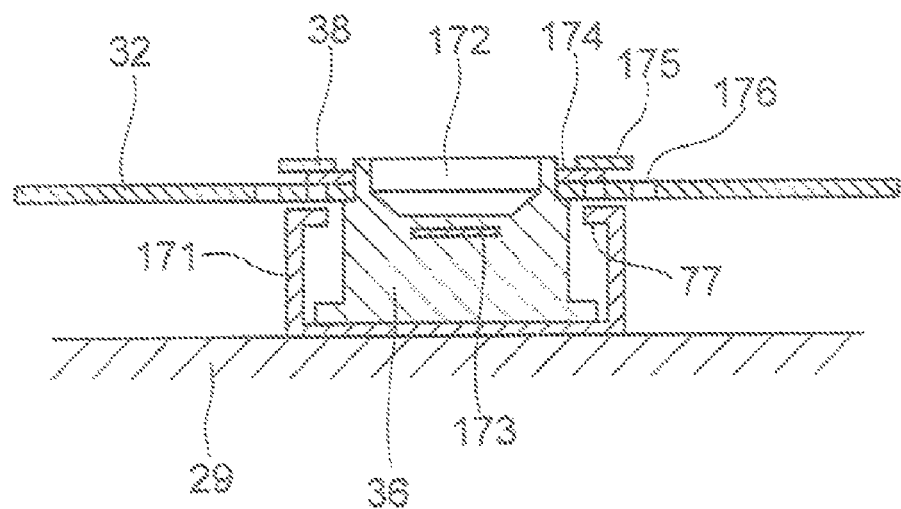
FIG. 22 shoes an embodiment of a cap provided with a floating stabilizing disc in the A-side recording and reproducing apparatus in accordance with the present invention.

The clamp moving table 29 is structured such as to attach the cap 36 pulled in by the magnetic suction force of the magnet embedded in the clamp portion 31 and fixing the optical disc 5 to the clamp portion 31, a cap holder 171 provided for holding the cap 36 so as to freely move up and down and rotate and shown in FIG. 22, the floating stabilizing disc 32 provided in the cap 36 and provided with the air hole in the inner peripheral side for stably rotating the optical disc 5 without any vibration in such a manner that the air flows to the outer periphery from the inner peripheral side of the floating stabilizing disc between the optical disc 5 and the floating stabilizing disc 32, and the floating spacer 38 detachably provided in the cap 36 for forming the initial gap between the optical disc 5 and the floating stabilizing disc 32 so as to move up and down.

The B-side recording and reproducing apparatus recording and reproducing the B side of the optical disc 5 is constituted by the tray take-out mechanism 55 for taking out the tray 1, the B-side recording and reproducing portion 45 for recording and reproducing the B side of the optical disc 5 arranged in the lower side of the tray take-out mechanism 55, the B-side recording and reproducing portion moving table 48 moving the B-side recording and reproducing portion 45 up and down, and the clamp moving table 49 moving the cap 56 for fixing the optical disc 5 arranged in the upper side of the tray take-out mechanism 55 to the clamp portion 51 of the B-side recording and reproducing portion 45 up and down.

The tray take-out mechanism 55 is constituted by the horizontal moving mechanism provided in the base 47 for mounting the tray 1 taken out from the cartridge 23 and moving in the cartridge direction, and the hook mechanism for hanging the hook on the hook hanging hole 8 provided in the base member 2 of the tray 1 shown in FIG. 8 provided in the horizontal moving mechanism so as take out the tray.

The peeling pawl 46 is provided for peeling the cover 3 of the tray 1 shown in FIG. 8, and is structured such as to push up the cover 3 from the cover lifting hole 10 provided in the base member 2 of the tray 1 shown in FIG. 8 by the projection material in the case that the tray 1 is taken out by the tray take-out mechanism 55, whereby the leading end of the cover is hanged on the peeling pawl 46 so as to be peeled.

The B-side recording and reproducing portion 45 is constituted by the spindle motor 50 for rotating the optical disc 5, the clamp portion 51 provided in the spindle motor 50 for fixing the optical disc 5, an adsorption ring 159 detachably inserted to the clamp portion 51 and magnetically sucked by the electromagnet 57, the optical portion 53 applying the light to the optical disc 5 so as to read and write the information, and the optical portion moving mechanism 54 moving the optical portion 53 in the radial direction of the disc.

The B-side recording and reproducing portion moving table 48 is structured such that the B-side recording and reproducing portion 45 is attached so as to move up and down.

The clamp moving table 49 is structured such as to be provided with the cap 56 pulled in by the magnetic suction force of the magnet embedded in the clamp portion 51 and fixing the optical disc 5 to the clamp portion 51, the cap holder 171 provided for holding the cap 56 so as to freely move up and down and rotate and shown in FIG. 22, the floating stabilizing disc 52 provided in the cap 56 and provided with the air hole in the inner peripheral side for stably rotating the optical disc 5 without any vibration in such a manner that the air flows to the outer periphery from the inner peripheral side of the floating stabilizing disc between the optical date 5 and the floating stabilizing disc 52, the floating spacer 58 provided in the floating stabilizing disc 52 for forming the initial gap between the optical disc 5 and the floating stabilizing disc 52, and the electromagnet 57 magnetically sucking the adsorption ring 159 by the electromagnet 57 so as to adsorb the optical disc 5 sandwiched therebetween, and move them up and down.

Further, reference numerals 21 and 22 denote the casing of the disc autochanger 20 and the insertion port 22 provided, in the casing 21 and inserting the cartridge 23 thereto. Reference numeral 15 denotes the guide of the moving table. The moving table, the tray take-out mechanism and the optical portion moving mechanism are structured such that the power is applied thereto by the driving source (not shown) so as to be movable.

Next, a description will be given of a recording and reproducing operation of the disc autochanger 20.

Figure 15:
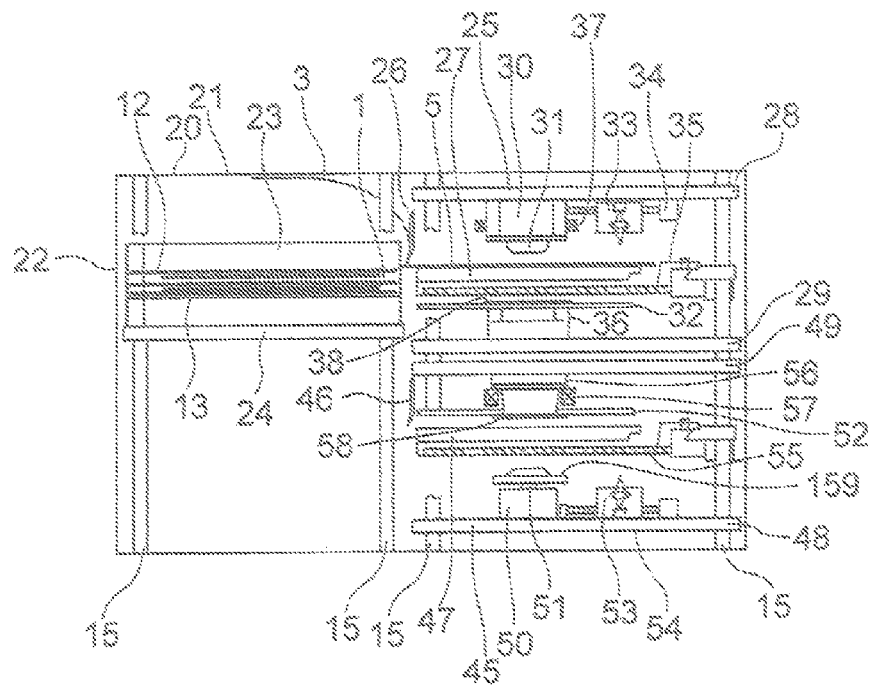
FIG. 15 shows a state in which the tray is taken out to the A-side recording and reproducing apparatus from the cartridge in an embodiment of a disc autochanger in accordance with the present invention.

First, as shown in FIG. 15, the cartridge moving table 24 is moved, and the designated tray 1 of the cartridge 23 is positioned at the position of the tray take-out mechanism 35 of the A-side recording and reproducing apparatus. Next, the tray take-out mechanism 35 is moved, and the tray 1 is taken out from the cartridge 23 so as to be moved to the position at which the optical disc 5 can be installed to the A-side recording and reproducing portion 25. At this time, the cover 3 is peeled from the tray 1 by the peeling pawl 26. Further, the structure is made such that a part of the tray 1 is left in the cartridge 23 in such a manner as to easily return the tray 1 to the cartridge 23.

Next, as shown in FIG. 16, the A-side recording and reproducing portion moving table 28 is moved in the downward direction so as to insert the clamp portion 31 to the clamp hole 6 of the optical disc 5 mounted on the tray 1 shown in FIG. 21, and the clamp moving table 29 is moved in the upward direction so as to suck the cap 36 on the basis of the magnetic suction force of the magnet in the clamp portion 31 and fit the cap 36 to the clamp portion 31. Next, the electromagnet 37 is excited, and the floating spacer 38 is sucked to the electromagnet 37 on the basis of the magnetic suction force. Accordingly, the optical disc 5 is sandwiched between the clamp portion 31 and the floating spacer 38 so as to be held. Next, the A-side recording and reproducing portion moving table 28 is moved in the upward direction so as to be stopped at a position at which the A-side recording and reproducing portion moving table 28 does not come into collision with the tray take-out mechanism 35. In the same manner, the clamp moving table 29 is moved in the downward direction so as to be stopped at a position at which the clamp moving table 29 does not come into collision with the tray take-out mechanism 35. Next, the tray take-out mechanism 35 is moved so as to press the tray 1 to the cartridge 23. Accordingly, the cartridge moving table 24 can move the cartridge 23 to the B-side recording and reproducing mechanism.

Next, as shown in FIG. 17, the A-side recording and reproducing portion moving table 28 is moved in the downward direction so as to be stopped near the base 27. Next, the clamp moving table 29 is moved in the upward direction so as to suck the cap 36 on the basis of the suction force of the magnet in the clamp portion 31 and fit the cap 36 to the clamp portion 31. Next, the current application of the electromagnet 37 is stopped. Accordingly, the optical disc 5 and the floating spacer 58 are fixed to the clamp portion 51. Thereafter, the clamp moving table 29 is moved and the cap 36 is set to the freely movable state, whereby the recording and reproducing of the A side is executed.

Next, as shown in FIG. 18, the cartridge moving table 24 is moved so as to position the designated tray 1 of the cartridge 23 at the position of the tray take-out mechanism 55 of the B-side recording and reproducing apparatus. Next, the tray take-out mechanism 55 is moved so as to take out the tray 1 from the cartridge 23 and move the optical disc 5 to the position at which the optical disc 5 can be installed to the B-side recording and reproducing portion 45. At this time, the cover 3 is peeled from the tray 1 by the peeling pawl 46. Further, the structure is made such that a part or the tray 1 is left in the cartridge 23 in such a manner as to easily return the tray 1 to the cartridge 23.

Next, as shown in FIG. 19, the B-side recording and reproducing portion moving table 48 is moved in the upward direction so as to insert the clamp portion 51 to the clamp hole 6 of the optical disc 5 mounted on the tray 1 shown in FIG. 8, and the clamp moving table 49 is moved in the downward direction so as to excite the electromagnet 57 and such the adsorption ring 159 to the electromagnet 57 on the basis of the magnetic suction force. Accordingly, the optical disc 5 is sandwiched between the electromagnet 57 and the floating spacer 58 so as to be held. Next, the B-side recording and reproducing portion moving table 48 is moved in the downward direction so as to be stopped at a position at which the B-side recording and reproducing portion moving table 48 does not come into collision with the tray take-out mechanism 55. In the same manner, the clamp moving table 49 is moved in the upward direction so as to be stopped at a position at which the clamp moving table 49 does not come into collision with the tray take-out mechanism 55. Next, the tray take-out mechanism 55 is moved so as to press the tray 1 to the cartridge 23. Accordingly, the cartridge moving table 24 can move the cartridge 23 to the A-side recording and reproducing mechanism.

Next, as shown in FIG. 20, the clamp moving table 49 is moved in the downward direction so as to be stopped near the base 47. Next, the B-side recording and reproducing portion moving table 48 is moved in the upward direction so as to insert the clamp portion 51 to the clamp hole 6 of the optical disc 5, suck the cap 56 on the basis of the suction force of the magnet and fit the cap 56 to the clamp portion 51. Next, the current application of the electromagnet 57 is stopped. Accordingly, the optical disc 5 and the adsorption ring 159 are fixed to the clamp portion 51. Thereafter, the clamp moving table 49 is moved so as to make the cap 56 in a freely movable state. Further, the electromagnet 57 is moved so as to be in a state in which the electromagnet 57 does not come into contact with the floating stabilizing disc, whereby the recording and reproducing of the B side is executed.

Next, a description will be given of an operation for returning the optical disc 5 of the A-side recording and reproducing apparatus to the cartridge 23. An operation returning to a state in FIG. 18 from a state in FIG. 20 via a state in FIG. 16 corresponds to the returning operation.

In the state in FIG. 17, the electromagnet 37 is excited so as to suck the floating spacer 38 to the electromagnet 37 on the basis of the magnetic suction force. Accordingly, the optical disc 5 is sandwiched between the clamp portion 31 and the floating spacer 38 so as to be held. Next, as shown in FIG. 16, the A-side recording and reproducing portion moving table 28 is moved in the upward direction so as to be stopped at the position at which the A-side recording and reproducing portion moving table 28 does not come into collision with the tray take-out mechanism 35. In the same manner, the clamp moving table 29 as moved so as to be stopped at the position at which the clamp moving table 29 does not come into collision with the tray take-out mechanism 35. Next, as shown in FIG. 15, the cartridge moving table 24 is moved so as to position the designated tray 1 of the cartridge 23 at the position of the tray take-out mechanism 35 of the A-side recording and reproducing apparatus. Next, the tray take-out mechanism 35 is moved so as to take out the tray 1 from the cartridge 23 and move at the position at which the optical disc 5 can be received from the A-side recording and reproducing portion 25. At this time, the cover 3 is peeled from the tray 1 by the peeling pawl 26. Further, the structure is made such that a part of the tray 1 is left in the cartridge 23 in such a manner as to easily return the tray 1 to the cartridge 23. Next, the A-side recording and reproducing portion moving table 28 is moved in the downward direction so as to stop the optical disc 5 near the tray 1. Next, the clamp moving table 29 is moved in the upward direction so as to fit the cap 36 to the clamp portion 31. Next, the current application of the electromagnet 37 is stopped. Next, the A-side recording and reproducing portion moving table 28 is moved in the upward direction so as to be stopped at the position at which the A-side recording and reproducing portion moving table 28 does not come into collision with the tray take-out mechanism 35. Next, the clamp moving table 29 is moved in the downward direction so as to be stopped at the position at which the clamp moving table 29 does not come into collision with the tray take-out mechanism 35. Accordingly, the optical disc 5 is returned to the tray 1, and the floating spacer 38 is returned to the cap 36. Next, the tray take-out mechanism 35 is moved so as to press the tray 1 to the cartridge 23. At this time, the cover 3 is put on the optical disc 5.

Next, a description will be given of an operation for returning the optical disc 5 of the B-side recording and reproducing apparatus to the cartridge 23. An operation returning to the state in FIG. 18 from the state in FIG. 20 via the state in FIG. 19 corresponds to the returning operation.

In the state in FIG. 20, the electromagnet 57 is excited so as to suck the adsorption ring 159 to the electromagnet 57 on the basis of the magnetic suction force. Accordingly, the optical disc 5 is sandwiched between the floating spacer 58 and the adsorption ring 159 so as to be held. Next, as shown in FIG. 19, the B-side recording and reproducing portion moving table 48 is moved in the downward direction so as to be stopped at the position at which the B-side recording and reproducing portion moving table 48 does not come into collision with the tray take-out mechanism 55. In the same manner, the clamp moving table 49 is moved in the upward direction so as to be stopped at the position at which the clamp moving table 49 does not come into collision with the tray take-out mechanism 55. Next, as shown in FIG. 18, the cartridge moving table 24 is moved so as to position the designated tray 1 of the cartridge 23 at the position of the tray take-out mechanism 55 of the B-side recording and reproducing apparatus. Next, the tray take-out mechanism 55 is moved so as to take out the tray 1 from the cartridge 23 and move the tray 1 to the position at which the optical disc 5 can be received from the B-side recording and reproducing portion 45. At this time, the cover 3 is peeled from the tray 1 by the peeling pawl 46. Further, the structure is made such that a part of the tray 1 is left in the cartridge 23 in such a manner as to easily return the tray 1 to the cartridge 23. Next, the clamp moving table 49 is moved in the downward direction so as to stop the optical disc 5 near the tray 1. Next, the B-side recording and reproducing portion moving table 48 is moved in the upward direction so as to insert the clamp portion 51 to the clamp hole 6 of the optical disc 5, and the cap 56 is fitted to the clamp portion 51. Next, the current application of the electromagnet 57 is stopped. Next, the B-side recording and reproducing portion moving table 48 is moved in the downward direction so as to be stopped at the position at which the B-side recording and reproducing portion moving table 48 does not come into collision with the tray take-out mechanism 55. Next, the clamp moving table 49 is moved in the upward direction so as to be stopped at the position at which the clamp moving table 48 does not come into collision with the tray take-out mechanism 55. Accordingly, the optical disc 5 is returned to the tray 1, and the adsorption ring 159 is returned to the clamp portion 51. Next, the tray take-out mechanism 55 is moved so as to press the tray 1 to the cartridge 23. At this time, the cover 3 is put on the optical disc 5.

Next, as a disc take-out order for continuously executing the recording and reproducing operation by using the disc autochanger 20 and the sheet-like both-surface recording and reproducing optical disc, the same order as Table 1 in the embodiment 1 can be applied as one example.

It is possible to structure the disc autochanger by arranging a plurality of only the A-side recording and reproducing apparatuses or a plurality of only the B-side recording and reproducing apparatuses in accordance with the embodiment 1 or the embodiment 2. In this case, it is possible to continuously execute the recording and reproducing and the parallel recording and reproducing by using the one-surface recording and reproducing optical disc.

Further, it is possible to structure a large-scale data recording and reproducing apparatus by arranging a plurality of the disc autochangers mentioned above in all directions and setting a mechanism for carrying the cartridge from a cartridge storage in each of the disc autochangers.

Further, it is possible to independently use the structure comprising the cartridge moving table and the A-side recording and reproducing apparatus, or the structure comprising the cartridge moving table and the B-side recording and reproducing apparatus.

Further, in the structure comprising the cartridge moving table and the A-side recording and reproducing apparatus, the electromagnet 37 is removed, and the floating spacer 38 is fixed to the cap 36. Further, the structure can be made such that the tray 1 is provided with a hole through which the floating stabilizing disc 32 can pass. In this structure, it is possible to execute the recording and reproducing in a state in which the tray 1 taken out from the cartridge 23 is not returned to the cartridge 23.

Further, in the structure comprising the cartridge moving table and the B-side recording and reproducing apparatus, the structure can be made such that the electromagnet 57 and the adsorption ring 159 are removed, and the tray 1 is provided with a hole passing the light of the optical portion 53 therethrough. In this structure, it is possible to execute the recording and reproducing in a state in which the tray 1 taken out from the cartridge 23 is not returned to the cartridge 23.

Further, one example of the sheet-like optical disc is obtained by forming the recording layer on the surface of the base material such as the polycarbonate resin, the polyester resin or the like having the thickness of about 0.05 mm to 0.2 mm, and can be recorded and reproduced in accordance with the format of the standard Blu-Ray, CD, DVD or the like. Further, the both-surface recording and reproducing sheet-like optical disc is formed by laminating two sheet-like optical discs. Further, the cartridge mentioned above stores about 100 sheet-like optical discs per a cartridge. Further, the recording and reproducing portion can use the commercially available recording and reproducing apparatus for Blu-Ray, CD, DVD or the like. Further, the floating stabilizing disc can use a glass, a metal, a resin or the like.

Further, the description mentioned above is given of the sheet-like both-surface recording and reproducing optical disc, however, it is possible to record and reproduce the one-surface optical disc. Further, it is possible to handle the optical disc having the standard thickness such as the Blu-Ray, the CD, the DVD or the like.

As mentioned above, in accordance with the present invention, there is obtained an effect that it is possible to execute the continuous recording and reproducing while using the optical disc stored in one cartridge by supplying the optical disc to the A-side recording and reproducing apparatus and the B-side recording and reproducing apparatus from the cartridge storing a plurality of both-surface recording and reproducing optical discs stored in the tray, fixing the optical disc to the recording and reproducing apparatus and thereafter returning the optical disc to the cartridge. Further, there is obtained an effect that it is possible to improve the transfer rate by operating the A-side recording and reproducing apparatus and the B-side recording and reproducing apparatus in parallel by using the optical discs stored in one cartridge.

Further, there is obtained an effect that it is possible to independently use the A-side recording and reproducing apparatus and the B-side recording and reproducing apparatus.

The tray 1 and the separator 12 can employ the same ones as those of the embodiment 1, respectively as shown in FIGS. 8 and 10.

FIG. 21 shows an embodiment of the electromagnet 37 for sucking and holding the optical disc 5 of the A-side recording and reproducing apparatus in accordance with the present invention. The spindle motor 30 is constituted by the clamp portion 31 attached so the spindle motor 30, and a magnet 166 embedded in the clamp portion 31.

The electromagnet 37 is structured such as to suck the floating spacer 38 shown in FIG. 15 and hold the optical disc 5 sandwiched between the electromagnet 37 and the floating spacer 38 in the clamp portion 31. Further, the electromagnet 37 is provided at a position at which the electromagnet 37 does not come into contact with the clamp portion 31 and the optical disc 5, and is constituted by a coil 68 wound around a yoke 167, and a magnet 69 for obtaining a holding force. Further, in the case of detaching the optical disc 5, the current application to the coil 68 is stopped, or the direction of the electric current applied to the coil 68 is reversed for canceling the holding force of the magnet 69. In this case, it is possible to omit the magnet 69.

As mentioned above, in accordance with the present invention, there is obtained an effect that the optical disc 5 is adsorbed and separated by the electromagnet, and the optical disc 5 does not come down even in the case that the current application is turned off.

Figure 23:
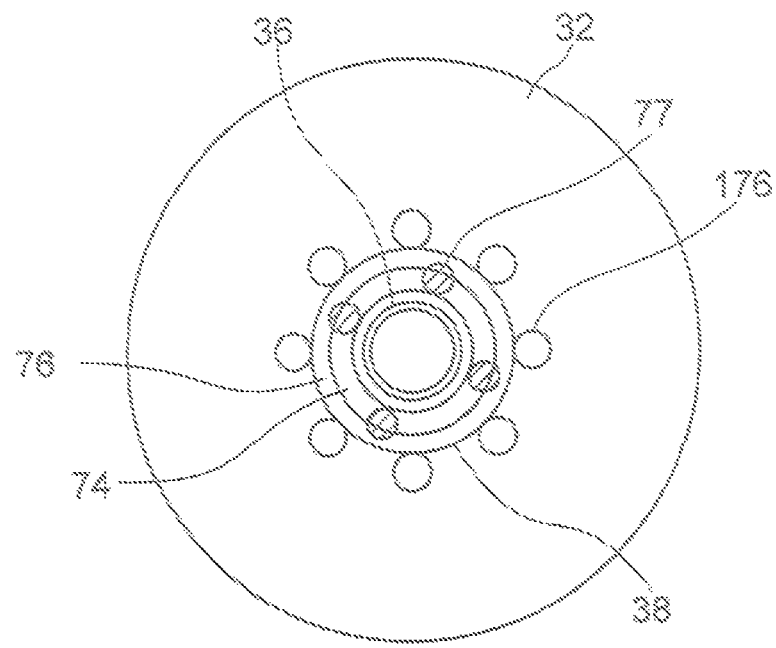
FIG. 23 shows an embodiment of the floating stabilizing disc in the A-side recording and reproducing apparatus in accordance with the present invention.

FIGS. 22 and 23 shows an embodiment of the cap 36 provided with the floating stabilizing disc 32 of the A-side recording and reproducing apparatus in accordance with the present invention. The cap 36 is stored in such a manner as to be movable in a vertical direction and a horizontal direction by a cap holder 171. Further, the cap 36 is provided with a hole 172 fitted to the clamp portion 31, and an iron piece 173 for being sucked to the magnet of the clamp portion 31. Further, the cap 36 is constituted by the flowing stabilizing disc 32 attached to the cap 36, the magnet 77 embedded in the floating stabilizing disc 32, an air hole 176 formed in the floating stabilizing disc 32 for sucking the air, and the floating spacer 38 comprising a ring 174 of a non-magnetic material embedded in the cap 36 and a ring of a ferromagnetic material attached to an outer peripheral portion of the ring 174. Further, the floating spacer 38 is sucked by the electromagnet and can be attached to and detached from the cap 36.

As mentioned above, in accordance with the present invention, since the ring 175 of the ferromagnetic material is attached to the outer peripheral portion of the ring 174 of the non-magnetic material, it is possible to detach the ring 175 of the ferromagnetic material from the magnetic field of the clamp portion 31. Accordingly, there is obtained an effect that the floating spacer 38 is not adsorbed at a time of moving the floating spacer 38 close to the clamp portion 31 for fitting.

Further, since the air hole 176 for sucking the air is provided in the inner periphery of the floating stabilizing disc 32, the air sucked from the air hole 176 flows toward the outer peripheral side on the basis of the rotation of the floating stabilizing disc 32. Accordingly, the negative pressure is generated between the optical disc 5 and the floating stabilizing disc 32, the optical disc 5 is sucked to the floating stabilizing disc 32 side, and there is obtained an effect that it is possible to obtain a stable rotation without any side runout in a state in which the optical disc 5 does not come into contact with the floating stabilizing disc 32.

Further, since the magnet 77 is embedded in the floating stabilizing disc 32, it is possible to suck the floating spacer 38 so as to hold.

Accordingly, there is obtained an effect that it is possible to prevent the floating spacer 38 from coming down from the cap 36 due to an impact or the like.

Figure 24:
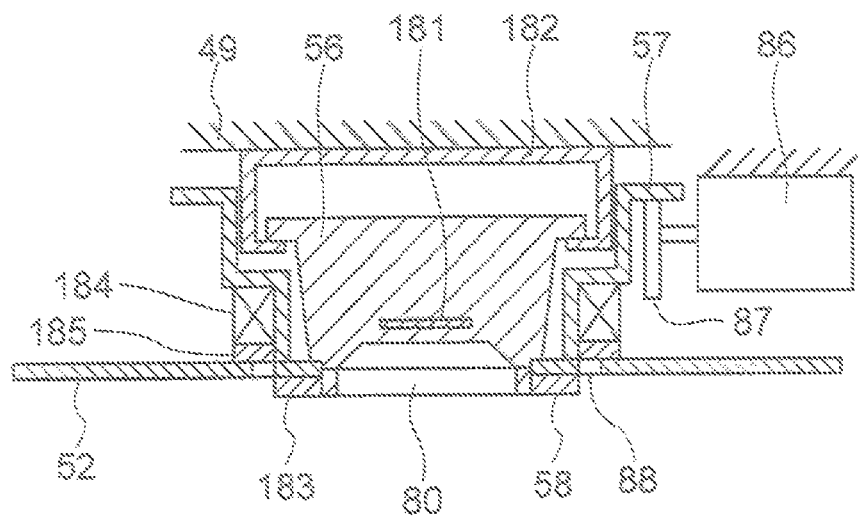
FIG. 24 shows an embodiment of an electromagnet for sucking and holding the optical disc in the B-side recording and reproducing apparatus in accordance with the present invention.

FIG. 24 shows an embodiment of the cap 56 and the electromagnet 57 of the B-side recording and reproducing apparatus in accordance with the present invention. The cap 56 is stored in such a manner as to be movable in the vertical direction and the horizontal direction by a cap holder 182. Further, the cap 56 is constituted by a hole 80 fitted to the clamp portion 51, an iron piece 181 for being sucked to the magnet of the clamp portion 51, the floating stabilizing disc 52 attached to the cap 56, an air hole 88 formed in the floating stabilizing disc 52 for sucking the air, and the floating spacer 58 attached to the cap 56.

The electromagnet 57 is structured such as to suck the adsorption ring 159 and adsorb the optical disc 5 sandwiched between the electromagnet 57 and the adsorption ring 159 to the floating spacer 58. Further, the electromagnet 57 is provided in an outer side of the cap holder 182, and is constituted by a coil 184 wound around a yoke 183, a magnet 185 for obtaining a holding force, a motor 86 moving the electromagnet 57 in the vertical direction, and an eccentric cam 87 attached to a shaft of the motor 86.

Further, in the case of adsorbing the optical disc 5, in a state in which the motor 86 is operated so as to move the eccentric cam 87 to a lowest position and set such that the electromagnet 57 can freely move working with the cap 56, the cap 56 is inserted to the clamp portion 51, and the coil 184 is excited so as to adsorb the optical disc 5. The magnet 185 is structured such as to keep the adsorption of the optical disc 5 even in the case that the current application of the coil 184 is turned off.

Further, in the case of detaching the optical disc 5 from the floating spacer 58, the current application of the coil 184 is stopped, or the direction of the electric current applied to the coil 184 is inverted for canceling the holding force of the magnet 185.

Further, in the case of rotating the cap 56 at a time of recording and reproducing, the clamp moving table 49 is moved so as to be moved to a position at which the cap 56 does not come into contact with the cap holder 182, and the motor 86 is moved so as to be moved at a highest position at which a bottom surface of the yoke 183 does not come into contact with the floating stabilizing disc 52.

Further, in the case of sandwiching the optical disc 5 between the floating spacer 58 and the adsorption ring 159 on the basis of the electromagnetic suction force of the electromagnet 57 so as to hold and detach from the clamp portion 51, the motor 86 is moved so as to move the eccentric cam 87 to the lowest position and make the electromagnet 57 freely move working with the cap 56, and thereafter the cap 56 is detached from the clamp portion 51. In this case, it is possible to omit the magnet 185.

As mentioned above, in accordance with the present invention, there is obtained an effect that it is possible to sandwich the optical disc 5 between the floating spacer 58 and the adsorption ring 159 on the basis of the electromagnetic suction force of the electromagnet 57 so as to hole, and it is possible to lift the optical disc 5 from the clamp portion 51 and return the optical disc 5.

Figure 25:
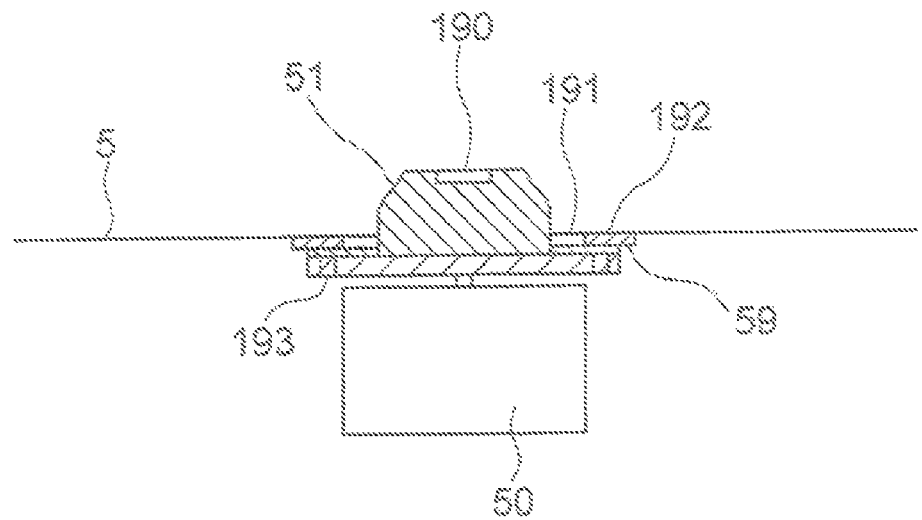
FIG. 25 shows an embodiment of an adsorption ring in the B-side recording and reproducing apparatus in accordance with the present invention.
Figure 26:
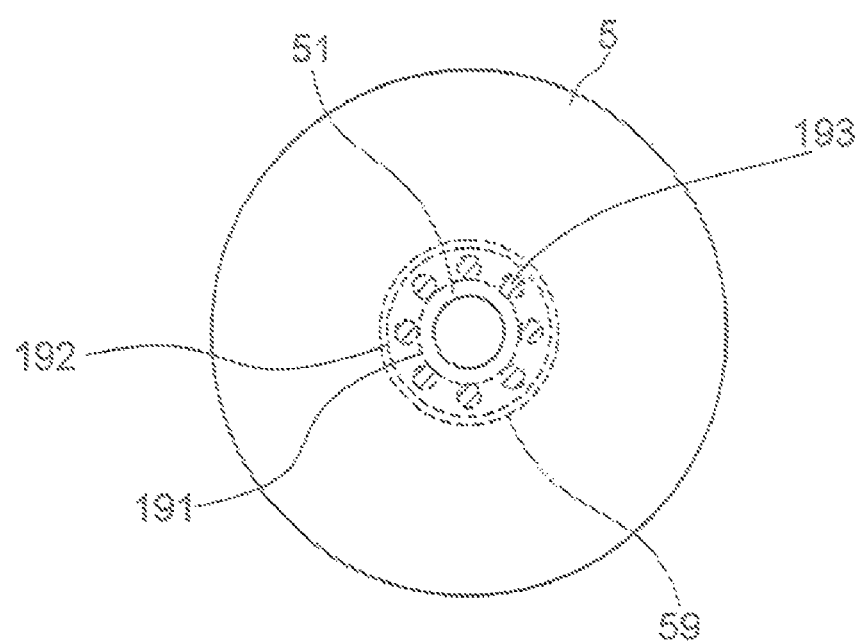
FIG. 26 shows an embodiment of a floating stabilizing disc in the B-side recording and reproducing apparatus in accordance with the present invention.

FIGS. 25 and 26 show an embodiment of the clamp portion 51 and the adsorption ring 159 or the B-side recording and reproducing apparatus in accordance with the present invention. FIGS. 25 and 26 show the spindle motor 50, the clamp portion 51 attached to the spindle motor 50, magnets 190 and 193 embedded in the clamp portion 51, an adsorption ring 159 constituted by a ring 191 of a non-magnetic material detachably fitted to the clamp portion 51 and a ring 192 of a ferromagnetic material attached to an outer peripheral portion of the ring 191, and the optical disc 5 mounted on the adsorption ring 159.

As mentioned above, in accordance with the present invention, since the ring 192 of the ferromagnetic material is attached to the outer peripheral portion of the ring 191 of the non-magnetic material, it is possible to detach the ring 192 of the ferromagnetic material from a magnetic field of the magnet 190. Accordingly, there is obtained an affect that the ring 192 of the ferromagnetic material can be lifted from the clamp portion 51 and returned without being adsorbed to the magnet 190.

Further, since the magnet 193 is embedded in the clamp portion 51, it is possible to suck and hold the adsorption ring 159. Accordingly, there is obtained an effect that it is possible to prevent the adsorption ring 159 from coming down from the clamp portion 51 due to the impact or the like.

The invention claimed is:

1. An optical disc recording and reproducing apparatus comprising:
    a tray mounting said optical disc thereon;
    a cartridge storing a lot of optical discs on trays and the cartridge storing a plurality of said trays; and
    a means for taking out said optical disc from said cartridge so as to record and reproduce, and returning said optical disc to said cartridge,
    wherein the optical disc recording and reproducing apparatus comprises:
    a moving table moving said cartridge up and down; and
    a tray take-out mechanism taking out said tray and carrying said optical disc to a recording and reproducing portion,
    wherein the recording and reproducing portion recording and reproducing an upper surface of said optical disc, and a moving table moving said recording and reproducing portion up and down are arranged in an upper side of said tray take-out mechanism,
    wherein a lower side of said tray take-out mechanism is provided with a cap fixing said optical disc to a rotating portion of said recording and reproducing portion, a connecting and disconnecting means capable of connecting and disconnecting said cap, and a moving table moving said cap and said connecting and disconnecting means up and down,
    wherein said tray is taken out from said cartridge, said optical disc is fixed to the rotating portion of said recording and reproducing portion by said cap by moving said recording and reproducing portion and the cap close to said optical disc on said tray, said cap is disconnected from said connecting and disconnecting means, said recording and reproducing portion and said connecting and disconnecting means are moved out of a moving passage of said tray take-out mechanism, and the upper surface of said optical disc is recorded and reproduced after returning said tray to said cartridge by said tray take-out mechanism.

2. An optical disc recording and reproducing apparatus comprising:
a tray mounting said optical disc thereon;
a cartridge storing a lot of optical discs on trays and the cartridge storing a plurality of said trays; and
a means for taking out said optical disc from said cartridge so as to record and reproduce, and returning said optical disc to said cartridge,
wherein the optical disc recording and reproducing apparatus comprises:
a moving table moving said cartridge up and down; and
a tray take-out mechanism taking out said tray and carrying said optical disc to a recording and reproducing portion,
wherein the recording and reproducing portion recording and reproducing a lower surface of said optical disc, and a moving table moving said recording and reproducing portion up and down are arranged in a lower side of said tray take-out mechanism,
wherein an upper side of said tray take-out mechanism is provided with a cap fixing said optical disc to a rotating portion of said recording and reproducing portion, a disc holding means adsorbing said optical disc, and a moving table moving said cap and said disc holding means up and down,
wherein said tray is taken out from said cartridge, said optical disc is adsorbed to said disc holding means by moving said recording and reproducing portion and said disc holding means close to said optical disc on said tray, said recording and reproducing portion and said disc holding means are moved out of a moving passage of said tray take-out mechanism, said tray is returned to said cartridge by said tray take-out mechanism, and the lower surface of said optical disc is recorded and reproduced after fixing said disc to the rotating portion of said recording and reproducing portion by said cap by moving said recording and reproducing portion, said cap and said disc holding means close to each other.

3. A disc autochanger, wherein the disc autochanger is structured by arranging in a vertical direction an optical disc recording and reproducing apparatus comprising:
a tray mounting said optical disc thereon;
a cartridge storing a lot of optical discs on trays and the cartridge storing a plurality of said trays; and
a means for taking out said optical disc from said cartridge so as to record and reproduce, and returning said optical disc to said cartridge,
wherein the optical disc recording and reproducing apparatus comprises:
a cartridge moving table moving said cartridge up and down; and
a first tray take-out mechanism taking out said tray and carrying said optical disc to a first recording and reproducing portion,
wherein the recording and reproducing portion recording and reproducing an upper surface of said optical disc, and a first moving table moving said first recording and reproducing portion up and down are arranged in an upper side of said first tray take-out mechanism,
wherein a lower side of said first tray take-out mechanism is provided with a first cap fixing said optical disc to a rotating portion of said first recording and reproducing portion, a connecting and disconnecting means capable of connecting and disconnecting said cap, and a third moving table moving said cap and said connecting and disconnecting means up and down,
wherein said tray is taken out from said cartridge, said optical disc is fixed to the rotating portion of said first recording and reproducing portion by said first cap by moving said first recording and reproducing portion and the cap close to said optical disc on said tray, said first cap is disconnected from said connecting and disconnecting means, said first recording and reproducing portion and said connecting and disconnecting means are moved out of a moving passage of said first tray take-out mechanism, and the upper surface of said optical disc is recorded and reproduced after returning said tray to said cartridge by said first tray take-out mechanism, and an optical disc recording and reproducing apparatus comprising:
a second tray take-out mechanism taking out said tray and carrying said optical disc to a second recording and reproducing portion,
wherein the recording and reproducing portion recording and reproducing a lower surface of said optical disc, and a second moving table moving said second recording and reproducing portion up and down are arranged in a lower side of said second tray take-out mechanism,
wherein an upper side of said second tray take-out mechanism is provided with a second cap fixing said optical disc to a rotating portion of said second recording and reproducing portion, a disc holding means adsorbing said optical disc, and a third moving table moving said cap and said disc holding means up and down,
wherein said tray is taken out from said cartridge, said optical disc is adsorbed to said disc holding means by moving said second recording and reproducing portion and said disc holding means close to said optical disc on said tray, said second recording and reproducing portion and said disc holding means are moved out of a moving passage of said second tray take-out mechanism, said tray is returned to said cartridge by said second tray take-out mechanism, and the lower surface of said optical disc is recorded and reproduced after fixing said disc to the rotating portion of said second recording and reproducing portion by said second cap by moving said second recording and reproducing portion, said cap and said disc holding means close to each other, and
wherein the disc autochanger is provided with a moving table moving said cartridge moving between said two optical disc recording and reproducing apparatuses, and said optical disc is supplied to said two optical disc recording and reproducing apparatuses from said cartridge so as to record and reproduce.

4. A disc autochanger, comprising:
a tray mounting said optical disc thereon;
a cartridge storing a plurality of said trays; and
a cartridge moving table moving said cartridge up and down,
wherein the disc autochanger is structured by arranging in a vertical direction optical disc recording and reproducing apparatuses, each comprising:
a means for taking out said optical disc from said cartridge so as to record and reproduce, and returning said optical disc to said cartridge,
wherein the optical disc recording and reproducing apparatus comprises:
a tray take-out mechanism taking out said tray and carrying said optical disc to a recording and reproducing portion, wherein the recording and reproducing portion recording and reproducing an upper surface of said optical disc, and a moving table moving said recording and reproducing portion up and down are arranged in an upper side of said tray take-out mechanism, wherein a lower side of said tray take-out mechanism is provided with a cap fixing said optical disc to a rotating portion of said recording and reproducing portion, a connecting and disconnecting means capable of connecting and disconnecting said cap, and a moving table moving said cap and said connecting and disconnecting means up and down, wherein said tray is taken out from said cartridge, said optical disc is fixed to the rotating portion of said recording and reproducing portion by said cap by moving said recording and reproducing portion and the cap close to said optical disc on said tray, said cap is disconnected from said connecting and disconnecting means, said recording and reproducing portion and said connecting and disconnecting means are moved out of a moving passage of said tray take-out mechanism, and the upper surface of said optical disc is recorded and reproduced after returning said tray to said cartridge by said tray take-out mechanism, and wherein the disc autochanger is provided with said cartridge moving table moving said cartridge moving between said two optical disc recording and reproducing apparatuses, and said optical disc is supplied to said two optical disc recording and reproducing apparatuses from said cartridge so as to record and reproduce.

5. A disc autochanger, comprising:
a tray mounting said optical disc thereon;
a cartridge storing a plurality of said trays;
a moving table moving said cartridge up and down; and
wherein the disc autochanger is structured by arranging in a vertical direction optical disc recording and reproducing apparatuses, each comprising:
a means for taking out said optical disc from said cartridge so as to record and reproduce, and returning said optical disc to said cartridge,
wherein the optical disc recording and reproducing apparatus comprises:
a tray take-out mechanism taking out said tray and carrying said optical disc to a recording and reproducing portion,
wherein the recording and reproducing portion recording and reproducing a lower surface of said optical disc, and a moving table moving said recording and reproducing portion up and down are arranged in a lower side of said tray take-out mechanism,
wherein an upper side of said tray take-out mechanism is provided with a cap fixing said optical disc to a rotating portion of said recording and reproducing portion, a disc holding means adsorbing said optical disc, and a moving table moving said cap and said disc holding means up and down,
wherein said tray is taken out from said cartridge, said optical disc is adsorbed to said disc holding means by moving said recording and reproducing portion and said disc holding means close to said optical disc on said tray, said recording and reproducing portion and said disc holding means are moved out of a moving passage of said tray take-out mechanism, said tray is returned to said cartridge by said tray take-out mechanism, and the lower surface of said optical disc is recorded and reproduced after fixing said disc to the rotating portion of said recording and reproducing portion by said cap by moving said recording and reproducing portion, said cap and said disc holding means close to each other, and wherein the disc autochanger is provided with said cartridge moving table moving said cartridge moving between said two optical disc recording and reproducing apparatuses, and said optical disc is supplied to said two optical disc recording and reproducing apparatuses from said cartridge so as to record and reproduce.

6. An optical disc recording and reproducing apparatus and a disc autochanger as claimed in claim 1, 3, or 4, wherein said connecting and disconnecting means connecting and disconnecting said cap is constituted by an electromagnet.

7. An optical disc recording and reproducing apparatus and a disc autochanger as claimed in claim 2, 3, or 5, wherein said disc holding means adsorbing said optical disc is constituted by an electromagnet, and is structured such as to suck a ring fitted to a lower side of said disc in the rotating portion of said recording and reproducing portion, and sandwich said disc between said ring and said electromagnet so as to hold in said disc holding means.

8. An optical disc recording and reproducing apparatus and a disc autochanger as claimed in any one of claims 1 to 5, wherein said disc holding means adsorbing said optical disc is constituted by an electromagnet, and is structured such as to suck a ring fitted to a lower side of said disc in the rotating portion of said recording and reproducing portion, and sandwich said disc between said ring and said electromagnet so as to hold in said disc holding means, and wherein a glass disc having a hole sucking an air in an inner peripheral side is provided in the rotating portion of said recording and reproducing portion, a ring is provided on said glass disc for spacing between said glass disc and said optical disc, and said optical disc is installed on said ring.

9. An optical disc recording and reproducing apparatus and a disc autochanger as claimed in claim 1 or 2, wherein said disc holding means adsorbing said optical disc is constituted by an electromagnet, and is structured such as to suck a ring fitted to a lower side of said disc in the rotating portion of said recording and reproducing portion, and sandwich said disc between said ring and said electromagnet so as to hold in said disc holding means, wherein a glass disc having a hole sucking an air in an inner peripheral side is provided in the rotating portion of said recording and reproducing portion, and a ring is provided on said glass disc for spacing between said glass disc and said optical disc, and wherein said ring is structured such that a ring of a ferromagnetic material is attached to an outer periphery of a ring of a non-magnetic material.

10. An optical disc recording and reproducing apparatus and a disc autochanger as claimed in any one of claims 1 to 5, wherein said disc holding means adsorbing said optical disc is constituted by an electromagnet, and is structured such as to suck a ring fitted to a lower side of said disc in the rotating portion of said recording and reproducing portion, and sandwich said disc between said ring and said electromagnet so as to hold in said disc holding means, wherein a glass disc having a hole sucking an air in an inner peripheral side is provided in the rotating portion of said recording and reproducing portion, a ring is provided on said glass disc for spacing between said glass disc and said optical disc, and said optical disc is installed on said ring, and wherein the magnet is embedded in an inner peripheral side of said glass disc.

11. An optical disc recording and reproducing apparatus comprising:
- a tray mounting said optical disc thereon;
- a cartridge storing a lot of optical discs on trays and the cartridge storing a plurality of said trays; and
- a means for taking out said optical disc from said cartridge so as to record and reproduce, and returning said optical disc to said cartridge,
- wherein the optical disc recording and reproducing apparatus comprises:
- a cartridge moving table moving said cartridge up and down; and
- a tray take-out mechanism taking out said tray and carrying said optical disc to a recording and reproducing portion,
- wherein the recording and reproducing portion recording and reproducing an upper surface of said optical disc, and a moving table moving said recording and reproducing portion up and down are arranged in an upper side of said tray take-out mechanism,
- wherein a lower side of said tray take-out mechanism is provided with a cap fixing said optical disc to a rotating portion of said recording and reproducing portion, a floating stabilizing disc stably floating said optical disc provided in said cap, and a moving table moving said cap up and down,
- wherein said tray is taken out from said cartridge, said optical disc is fixed to the rotating portion of said recording and reproducing portion by said cap by moving said recording and reproducing portion and said cap to said optical disc on said tray, and the upper surface of said optical disc is recorded and reproduced.

12. An optical disc recording and reproducing apparatus comprising:
- a tray mounting said optical disc thereon;
- a cartridge storing a lot of optical discs on trays and the cartridge storing a plurality of said trays; and
- a means for taking out said optical disc from said cartridge so as to record and reproduce, and returning said optical disc to said cartridge,
- wherein the optical disc recording and reproducing apparatus comprises:
- a cartridge moving table moving said cartridge up and down; and
- a tray take-out mechanism taking out said tray and carrying said optical disc to a recording and reproducing portion,
- wherein the recording and reproducing portion recording and reproducing an upper surface of said optical disc, a disc holding means lifting up said optical disc, and a moving table moving said recording and reproducing portion and said disc holding means up and down are arranged in an upper side of said tray take-out mechanism,
- wherein a lower side of said tray take-out mechanism is provided with a cap fixing said optical disc to a rotating portion of said recording and reproducing portion, a floating stabilizing disc stably floating said optical disc provided in said cap, and a moving table moving said cap up and down,
- wherein said tray is taken out from said cartridge, said optical disc is held by said disc holding means by moving said disc holding means and said cap close to said optical disc on said tray, said disc holding means holding said optical disc and said cap are moved out of a moving passage of said tray take-out mechanism, said tray is returned to said cartridge by said tray take-out mechanism, and the upper surface of said optical disc is recorded and reproduced after fixing said optical disc of said disc holding means to the rotating portion of said recording and reproducing portion by said cap.

13. An optical disc recording and reproducing apparatus comprising:
- a tray mounting said optical disc thereon;
- a cartridge storing a lot of optical discs on trays and the cartridge storing a plurality of said trays; and
- a means for taking out said optical disc from said cartridge so as to record and reproduce, and returning said optical disc to said cartridge,
- wherein the optical disc recording and reproducing apparatus comprises:
- a cartridge moving table moving said cartridge up and down; and
- a tray take-out mechanism taking out said tray and carrying said optical disc to a recording and reproducing portion,
- wherein the recording and reproducing portion recording and reproducing a lower surface of said optical disc, and a moving table moving said recording and reproducing portion up and down are arranged in a lower side of said tray take-out mechanism,
- wherein an upper side of said tray take-out mechanism is provided with a cap fixing said optical disc to a rotating portion of said recording and reproducing portion, a floating stabilizing disc stably floating said optical disc provided in said cap, and a moving table moving said cap up and down,
- wherein said tray is taken out from said cartridge, said optical disc is fixed to the rotating portion of said recording and reproducing portion by moving said recording and reproducing portion and said cap to said optical disc on said tray, and the lower surface of said optical disc is recorded and reproduced.

14. An optical disc recording and reproducing apparatus comprising:
- a tray mounting said optical disc thereon;
- a cartridge storing a lot of optical discs on trays and the cartridge storing a plurality of said trays; and
- a means for taking out said optical disc from said cartridge so as to record and reproduce, and returning said optical disc to said cartridge,
- wherein the optical disc recording and reproducing apparatus comprises:
- a cartridge moving table moving said cartridge up and down; and
- a tray take-out mechanism taking out said tray and carrying said optical disc to a recording and reproducing portion,
- wherein the recording and reproducing portion recording and reproducing a lower surface of said optical disc, and a moving table moving said recording and reproducing portion up and down are arranged in a lower side of said tray take-out mechanism,
- wherein an upper side of said tray take-out mechanism is provided with a cap fixing said optical disc to a rotating portion of said recording and reproducing portion, a floating stabilizing disc stably floating said optical disc provided in said cap, a disc holding means lifting up said optical disc, and a moving table moving said cap and said disc holding means up and down,
- wherein said tray is taken out from said cartridge, said optical disc is held by said disc holding means by moving said recording and reproducing portion and said disc holding means to said optical disc on said tray, said disc holding means holding said optical disc and said recording and reproducing portion are moved out of a moving passage of said tray take-out mechanism, said tray is returned to said cartridge by said tray take-out mechanism, and the lower surface of said optical disc is recorded and reproduced after fixing said optical disc of said disc holding means to the rotating portion of said recording and reproducing portion by said cap.

15. A disc autochanger, comprising:
a tray mounting said optical disc thereon;
a cartridge storing a plurality of said trays;
a cartridge moving table moving said cartridge up and down; and
wherein the disc autochanger is structured by arranging in a vertical direction an optical disc recording and reproducing apparatus comprising:
a means for taking out said optical disc from said cartridge so as to record and reproduce, and returning said optical disc to said cartridge,
wherein the optical disc recording and reproducing apparatus comprises:
a first tray take-out mechanism taking out said tray and carrying said optical disc to a recording and reproducing portion,
wherein the first recording and reproducing portion recording and reproducing an upper surface of said optical disc, a disc holding means lifting up said optical disc, and a first moving table moving said first recording and reproducing portion and said disc holding means up and down are arranged in an upper side of said tray take-out mechanism,
wherein a lower side of said first tray take-out mechanism is provided with a cap fixing said optical disc to a rotating portion of said first recording and reproducing portion, a floating stabilizing disc stably floating said optical disc provided in said cap, and a moving table moving said cap up and down,
wherein said tray is taken out from said cartridge, said optical disc is held by said disc holding means by moving said disc holding means and said cap close to said optical disc on said tray, said disc holding means holding said optical disc and said cap are moved out of a moving passage of said tray take-out mechanism, said tray is returned to said cartridge by said tray take-out mechanism, and the upper surface of said optical disc is recorded and reproduced after fixing said optical disc of said disc holding means to the rotating portion of said recording and reproducing portion by said cap, and an optical disc recording and reproducing apparatus comprising:
a means for taking out said optical disc from said cartridge so as to record and reproduce, and returning said optical disc to said cartridge,
wherein the optical disc recording and reproducing apparatus comprises:
a second tray take-out mechanism taking out said tray and carrying said optical disc to a recording and reproducing portion,
wherein the second recording and reproducing portion recording and reproducing a lower surface of said optical disc, and a second moving table moving said second recording and reproducing portion up and down are arranged in a lower side of said tray take-out mechanism,
wherein an upper side of said second tray take-out mechanism is provided with a cap fixing said optical disc to a rotating portion of said second recording and reproducing portion, a floating stabilizing disc stably floating said optical disc provided in said cap, a disc holding means lifting up said optical disc, and a moving table moving said cap and said disc holding means up and down,
wherein said tray is taken out from said cartridge, said optical disc is held by said disc holding means by moving said recording and reproducing portion and said disc holding means to said optical disc on said tray, said disc holding means holding said optical disc and said recording and reproducing portion are moved out of a moving passage of said tray take-out mechanism, said tray is returned to said cartridge by said tray take-out mechanism, and the lower surface of said optical disc is recorded and reproduced after fixing said optical disc of said disc holding means to the rotating portion of said recording and reproducing portion by said cap, and
wherein the disc autochanger is provided with said cartridge moving table moving said cartridge moving between said two optical disc recording and reproducing apparatuses, and said optical disc is supplied to said two optical disc recording and reproducing apparatuses from said cartridge so as to record and reproduce.

16. A disc autochanger, comprising:
a tray mounting said optical disc thereon;
a cartridge storing a plurality of said trays;
a moving table moving said cartridge up and down; and
wherein the disc autochanger is structured by arranging in a vertical direction optical disc recording and reproducing apparatuses, each comprising:
a means for taking out said optical disc from said cartridge so as to record and reproduce, and returning said optical disc to said cartridge,
wherein the optical disc recording and reproducing apparatus comprises:
a tray mounting said optical disc thereon;
a cartridge storing a plurality of said trays;
a moving table moving said cartridge up and down; and
a tray take-out mechanism taking out said tray and carrying said optical disc to a recording and reproducing portion,
wherein the recording and reproducing portion recording and reproducing an upper surface of said optical disc, a disc holding means lifting up said optical disc, and a moving table moving said recording and reproducing portion and said disc holding means up and down are arranged in an upper side of said tray take-out mechanism,
wherein a lower side of said tray take-out mechanism is provided with a cap fixing said optical disc to a rotating portion of said recording and reproducing portion, a floating stabilizing disc stably floating said optical disc provided in said cap, and a moving table moving said cap up and down,
wherein said tray is taken out from said cartridge, said optical disc is held by said disc holding means by moving said disc holding means and said cap close to said optical disc on said tray, said disc holding means holding said optical disc and said cap are moved out of a moving passage of said tray take-out mechanism, said tray is returned to said cartridge by said tray take-out mechanism, and the upper surface of said optical disc is recorded and reproduced after fixing said optical disc of said disc holding means to the rotating portion of said recording and reproducing portion by said cap, and
wherein the disc autochanger is provided with a moving table moving said cartridge moving between said two optical disc recording and reproducing apparatuses, and said optical disc is supplied to said two optical disc recording and reproducing apparatuses from said cartridge so as to record and reproduce.

17. A disc autochanger, comprising:
a tray mounting said optical disc thereon;
a cartridge storing a plurality of said trays;
a moving table moving said cartridge up and down; and
wherein the disc autochanger is structured by arranging in a vertical direction optical disc recording and reproducing apparatuses, each comprising:
a means for taking out said optical disc from said cartridge so as to record and reproduce, and returning said optical disc to said cartridge,
wherein the optical disc recording and reproducing apparatus comprises:
a tray take-out mechanism taking out said tray and carrying said optical disc to a recording and reproducing portion,
wherein the recording and reproducing portion recording and reproducing a lower surface of said optical disc, and a moving table moving said recording and reproducing portion up and down are arranged in a lower side of said tray take-out mechanism,
wherein an upper side of said tray take-out mechanism is provided with a cap fixing said optical disc to a rotating portion of said recording and reproducing portion, a floating stabilizing disc stably floating said optical disc provided in said cap, a disc holding means lifting up said optical disc, and a moving table moving said cap and said disc holding means up and down,
wherein said tray is taken out from said cartridge, said optical disc is held by said disc holding means by moving said recording and reproducing portion and said disc holding means to said optical disc on said tray, said disc holding means holding said optical disc and said recording and reproducing portion are moved out of a moving passage of said tray take-out mechanism, said tray is returned to said cartridge by said tray take-out mechanism, and the lower surface of said optical disc is recorded and reproduced after fixing said optical disc of said disc holding means to the rotating portion of said recording and reproducing portion by said cap, and
wherein the disc autochanger is provided with a moving table moving said cartridge moving between said two optical disc recording and reproducing apparatuses, and said optical disc is supplied to said two optical disc recording and reproducing apparatuses from said cartridge so as to record and reproduce.

18. An optical disc recording and reproducing apparatus and a disc autochanger as claimed in claim 12, 15, or 16, wherein said disc holding means lifting up said optical disc is constituted by an electromagnet, sucks a ring fitted to said cap, and holds said disc between said ring and said electromagnet.

19. An optical disc recording and reproducing apparatus and a disc autochanger as claimed in claim 14, 15, or 17, wherein said disc holding means lifting up the optical disc is constituted by an electromagnet, sucks a ring fitted to the rotating portion of said recording and reproducing portion, and holds said disc between said ring and said electromagnet.

20. An optical disc recording and reproducing apparatus and a disc autochanger as claimed in claim 12, 14, 15, 16 or 17, wherein said ring is structured such that the ring is attached to an outer periphery of a ring of a non-magnetic material.

21. An optical disc recording and reproducing apparatus and a disc autochanger as claimed in claim 12, 14, 15, 16 or 17, wherein a hole sucking an air is provided in an inner peripheral side of said floating stabilizing disc.

22. An optical disc recording and reproducing apparatus and a disc autochanger as claimed in any one of claims 11 to 17, wherein said floating stabilizing disc is provided with a hole sucking an air in an inner peripheral side, a spacer is provided on said floating stabilizing disc for spacing between said floating stabilizing disc and said optical disc, and said optical disc is installed on said spacer.

23. An optical disc recording and reproducing apparatus and a disc autochanger as claimed in any one of claims 11 to 17, wherein said floating stabilizing disc is provided with a hole sucking an air in an inner peripheral side, a spacer is provided on said floating stabilizing disc for spacing between said floating stabilizing disc and said optical disc, said optical disc is installed on said spacer, and a magnet is embedded in an inner peripheral side of said floating stabilizing disc.

24. An optical disc recording and reproducing apparatus and a disc autochanger as claimed in any one of claims 11 to 17, wherein said floating stabilizing disc is provided with a hole sucking an air in an inner peripheral side, a spacer is provided on said floating stabilizing disc for spacing between said floating stabilizing disc and said optical disc, said optical disc is installed on said spacer, a magnet is embedded in an inner peripheral side of said floating stabilizing disc, and a magnet is embedded at a position facing to said optical disc plane in the rotating portion of said recording and reproducing portion.

25. An optical disc recording and reproducing apparatus as claimed in any one of claims 1 to 5, and 11 to 17, further comprising
a clamp mechanism attaching and detaching an optical disc to and from a disc rotating portion,
wherein the optical disc recording and reproducing apparatus comprises:
said disc rotating portion provided with a columnar projection to which a clamp hole of said optical disc is inserted;
a cylindrical cap inserted to said columnar projection so as to fix said optical disc; and
the columnar projection in which a leading end provided within a cylinder of said cap and having a taper is movable between inner and outer sides of said cylinder, and
wherein said optical disc is fixed by fitting said cap to the columnar projection of said disc rotating portion after inserting the columnar projection of said cap to the clamp hole of said optical disc.

26. An optical disc recording and reproducing apparatus as claimed in any one of claims 1 to 5, and 11 to 17, further comprising:
a cartridge storing a lot of sheet-like optical discs having a flexibility; and
a means taking out said optical disc from said cartridge so as to record and reproduce, and returning said optical disc to said cartridge,
wherein a concaved notch portion is provided in facing surfaces in an inner side of said cartridge, a convex portion of a separator provided with a convex portion in a part of the sheet is inserted to said notch portion, the tray having said optical disc inserted to said shelf and said separator are alternately laminated, and the adjacent tray is not taken out together at a time of taking out the tray.

* * * * *